US006313737B1

(12) United States Patent
Freeze et al.

(10) Patent No.: US 6,313,737 B1
(45) Date of Patent: Nov. 6, 2001

(54) CENTRALIZED TRANSPONDER ARBITRATION

(75) Inventors: Deron W. Freeze, Gold Hill; John C. Greene, Greensboro, both of NC (US)

(73) Assignee: Marconi Commerce Systems Inc.

( * ) Notice: Subject to any disclaimer, the term of this patent is extended or adjusted under 35 U.S.C. 154(b) by 0 days.

(21) Appl. No.: 09/102,805

(22) Filed: Jun. 23, 1998

(51) Int. Cl.[7] .......... H04Q 5/22

(52) U.S. Cl. .......... 340/10.1; 340/10.1; 340/10.2; 340/10.3; 340/998; 340/991; 340/992; 340/993; 705/13; 364/528.37; 141/129; 235/384

(58) Field of Search .......... 340/10.1, 2, 3, 340/988, 991–993; 141/94, 129; 364/528.37; 705/13; 235/384

(56) References Cited

U.S. PATENT DOCUMENTS

| | | | |
|---|---|---|---|
| 3,536,109 | 10/1970 | Ginsburgh et al. | 141/98 |
| 3,642,036 | 2/1972 | Ginsburgh et al. | 141/94 |
| 3,650,303 | 3/1972 | Chambers et al. | 141/1 |
| 3,662,924 | 5/1972 | Crandall et al. | 222/64 |
| 3,786,421 | 1/1974 | Wostl et al. | 340/149 |

(List continued on next page.)

FOREIGN PATENT DOCUMENTS

| | | |
|---|---|---|
| 0461888 | 12/1991 | (EP) . |
| 2 222 714 A | 3/1990 | (GB) . |
| 102768/2 | 8/1992 | (IL) . |
| 04128186 | 4/1992 | (JP) . |
| 6227597 | 8/1994 | (JP) . |
| WO 94/05592 | 3/1994 | (WO) . |
| WO 94/06031 | 3/1994 | (WO) . |
| WO 94/19781 | 9/1994 | (WO) . |
| WO 9514612 | 6/1995 | (WO) . |
| WO 95/32919 | 12/1995 | (WO) . |
| WO 96/28791 | 9/1996 | (WO) . |
| WO 9639351 | 12/1996 | (WO) . |
| WO 97/21626 | 6/1997 | (WO) . |
| WO 97/24689 | 7/1997 | (WO) . |
| 944327 | 6/1994 | (ZA) . |

OTHER PUBLICATIONS

Copy of European Search Report mailed Sep. 25, 2000 in corresponding European Application No. EP 99304901.

CARB—Estimated Hyudrcarbon Emissions of Phase II and Onboard Vapor Recovery Systems; Apr. 13, 1994.

CARB—Staff's Proposesd Recommendation For The Adoption Of The United States Environmental Protection Agency's Vehicle Refueling Standard and Test Procedures; Apr. 27, 1994.

Micron Communications, Inc.—Meeting Notice dated Feb. 4, 1997.

SAE Meeting Notice; May 27, 1997.

SAE ORVR Task Force Meeting Agenda; May 29, 1997.

*Primary Examiner*—Michael Horabik
*Assistant Examiner*—William L Bangacholi
(74) *Attorney, Agent, or Firm*—Withrow & Terranova PLLC

(57) ABSTRACT

A system and method to store a sequence of data records relating to attributes of interactions between fuel dispensers and tags. The data records may be stored on the tag or at a location remote from the tag, such as a fuel dispenser, central site controller or other network. The data records may contain the identity of the dispenser, tag and any attribute of a received signal, such as frequency band or signal strength, or other attribute indicative of proximity. Every dispenser that attempts to communicate with a tag in question adds its own interaction data to a limited history of a tag's past interactions with the same and other dispensers. When a dispenser or central site control system examines the contents of the interaction histories, the detected presence of other dispensers or the relative strength of the recorded interaction attributes will determine what, if any, action is to be taken by the dispensers or central site control system to communicate with the tag at issue.

37 Claims, 15 Drawing Sheets

U.S. PATENT DOCUMENTS

| | | | |
|---|---|---|---|
| 3,814,148 | 6/1974 | Wostl | 141/98 |
| 4,263,945 | 4/1981 | Van Ness | 141/98 |
| 4,313,168 | 1/1982 | Stephens et al. | 364/465 |
| 4,345,146 | 8/1982 | Story et al. | 235/381 |
| 4,469,149 | 9/1984 | Walkey et al. | 141/94 |
| 4,490,798 | 12/1984 | Franks et al. | 365/550 |
| 4,532,511 | 7/1985 | Lemelson | 340/933 |
| 4,600,829 | 7/1986 | Walton | 236/439 |
| 4,711,994 | 12/1987 | Greenberg | 235/384 |
| 4,714,925 | 12/1987 | Bartlett | 340/825.55 |
| 4,728,955 | 3/1988 | Hane | 3432/140 |
| 4,760,533 | 7/1988 | Bydlon | 365/465 |
| 4,804,937 | 2/1989 | Barbiaux et al. | 340/52 |
| 4,846,233 | 7/1989 | Fockens | 141/94 |
| 4,881,581 | 11/1989 | Hollerback | 141/113 |
| 4,887,578 | 12/1989 | Woodcock et al. | 23/519 |
| 4,897,642 | 1/1990 | DiLullo et al. | 340/825 |
| 4,934,419 | 6/1990 | Lamont et al. | 141/94 |
| 4,967,366 | 10/1990 | Kaehler | 365/479 |
| 5,003,472 | 3/1991 | Perrill et al. | 365/401 |
| 5,025,253 | 6/1991 | DiLullo et al. | 340/825.06 |
| 5,058,044 | 10/1991 | Stewart et al. | 364/551.01 |
| 5,070,328 | 12/1991 | Fockens | 340/825.54 |
| 5,072,380 | 12/1991 | Randleman et al. | 364/406 |
| 5,086,389 | 2/1992 | Hassett et al. | 365/401 |
| 5,128,862 | 7/1992 | NUeller | 364/405 |
| 5,131,441 | 7/1992 | Simpson et al. | 141/209 |
| 5,156,198 | 10/1992 | Hall | 141/94 |
| 5,184,309 | 2/1993 | Simpson et al. | 364/510 |
| 5,204,512 | 4/1993 | Ieki et al. | 235/382 |
| 5,204,819 | 4/1993 | Ryan | 364/465 |
| 5,217,051 | 6/1993 | Simpson et al. | 141/59 |
| 5,218,527 | 6/1993 | Ishikawa et al. | 364/405 |
| 5,238,034 | 8/1993 | Corfitsen | 141/94 |
| 5,249,612 | 10/1993 | Parks et al. | 141/219 |
| 5,249,707 | 10/1993 | Simpson et al. | 222/40 |
| 5,253,162 | 10/1993 | Hassett et al. | 364/405 |
| 5,267,592 | 12/1993 | Kaplan et al. | 141/387 |
| 5,327,066 | 7/1994 | Smith | 320/2 |
| 5,327,945 | 7/1994 | Simpson et al. | 141/59 |
| 5,343,906 | 9/1994 | Tibbals, III | 141/83 |
| 5,351,187 | 9/1994 | Hassett | 364/401 |
| 5,359,522 | 10/1994 | Ryan | 365/465 |
| 5,363,889 | 11/1994 | Simpson et al. | 141/208 |
| 5,365,984 | 11/1994 | Simpson et al. | 141/387 |
| 5,383,500 | 1/1995 | Dwars et al. | 141/98 |
| 5,392,049 | 2/1995 | Gunnarsson | 342/42 |
| 5,393,195 | 2/1995 | Corfitsen | 414/749 |
| 5,414,427 | 5/1995 | Gunarsson | 342/51 |
| 5,422,624 | 6/1995 | Smith | 340/438 |
| 5,444,742 | 8/1995 | Grabow et al. | 375/267 |
| 5,485,520 | 1/1996 | Chaum et al. | 380/24 |
| 5,495,250 | 2/1996 | Ghaem et al. | 342/51 |
| 5,499,181 | 3/1996 | Smith | 365/424 |
| 5,505,234 | 4/1996 | Simpson et al. | 141/206 |
| 5,541,835 | 7/1996 | Dextraze et al. | 364/401 |
| 5,552,789 | 9/1996 | Schuermann | 342/42 |
| 5,557,268 | 9/1996 | Hughes et al. | 340/933 |
| 5,562,133 | 10/1996 | MItchell | 141/206 |
| 5,602,538 * | 2/1997 | Orthmann et al. | 340/10.1 |
| 5,605,182 | 2/1997 | Oberrecht et al. | 141/94 |
| 5,609,190 | 3/1997 | Anderson et al. | 141/59 |
| 5,621,411 | 4/1997 | Hagl et al. | 342/42 |
| 5,621,412 | 4/1997 | Sharpe et al. | 342/51 |
| 5,628,351 | 5/1997 | Ramsey, Jr. et al. | 141/98 |
| 5,671,786 | 9/1997 | Corfitsen | 141/94 |
| 5,717,374 | 2/1998 | Smith | 340/438 |

* cited by examiner

| DISP. | STRENGTH |
|---|---|
| A | 200 |
| B | 35 |
| C | 5 |
| A | 175 |
| C | 15 |
| B | 55 |

36

CENTRAL CONTROL MEMORY

| TXP. | DISP. | STRENGTH |
|---|---|---|
| 1 | A | 200 |
| 1 | B | 35 |
| 1 | C | 5 |
| 1 | A | 175 |
| 1 | C | 15 |
| 1 | B | 55 |

CENTRALIZED TRANSPONDER ARBITRATION

Background of the Invention

The present invention relates generally to communicating with transponders in a fueling environment and, more particularly, to a dispensing system capable of arbitrating between competing tags and dispensers to ensure a dispenser communicates with the tag most proximate to that dispenser.

In recent years, traditional gasoline pumps at service stations have evolved into elaborate point-of-sale (POS) devices having sophisticated control electronics and user interfaces with large displays and touch pads (or screens). These dispensers include various types of payment means, such as card readers, to expedite and further enhance fueling transactions. A customer is not limited to the purchase of fuel at the dispenser. More recent dispensers allow the customer to purchase services, such as car washes, and goods such as fast food or convenience store products at the dispenser. Once purchased, the customer need only pick up the goods and services at the station store.

Given the ever increasing demand to increase transaction efficiency by both fuel suppliers and customers, transaction systems associated with the service stations are further evolving to provide fully automated authorization and purchasing. It would be advantageous if customers no longer needed to use a credit/debit card or smartcard to purchase fuel or other products or services. This can be accomplished if the customer, vehicle or both are equipped with a remote intelligent communications device, or transponder (hereinafter referred to as a tag for simplicity), capable of remotely communicating with fuel dispensers and other devices as desired. These tags and dispensers operate in conjunction to provide a cashless and cardless transaction system where transactions are automatically charged or debited without requiring any action by the customer. A tag is a remote communication device capable of unidirectional or bi-directional communications to and/or from a fuel dispenser's remote communications system.

Numerous patents have issued and foreign applications published relating to technology associated with communicating information between a tag or like transponder and the fuel dispenser. These patents disclose communicating between the tag and fuel dispenser with fiber optics, electromagnetic radiation, such as radio frequency transmissions, infrared, direct electrical connections and various others means or combination of these means. Various types of information are communicated between the tag and the dispenser including vehicle identification, customer identification, account information, fuel requirements, diagnostics, advertising, and various other types of solicited and unsolicited messages. Certain specific applications equip the tag and dispenser with cryptography electronics to encrypt and decrypt data transferred between the tag and dispenser.

Tag transponder technology is used in many areas of technology relating to vehicles. Such technology is used in tracking vehicles, navigational aids, toll collection, diagnostics, vehicle security and theft deterrence, keyless entry, refueling, collision avoidance, vehicle identification, surveillance and traffic control as well as transmitting and receiving financial data.

In theory, such communications between a tag and a fuel dispenser appear to be an answer to increasing transactional efficiencies. However, when multiple tags are used in an application where a single tag can be read by multiple devices, the problem of location arbitration becomes an issue. Location arbitration is defined as the process of determining the physical closest proximity of a tag to a dispenser in applications where the proximity of the tag to the dispenser basically determines which dispenser and dispenser side should interact with the tag.

One example is the use of a tag to authorize a credit card transaction at a gasoline dispenser in place of a credit card. In this instance, multiple dispensers might have the ability to read the same tag but, by nature of the application, only the dispenser that is closest to the tag is meant to interact with the tag. To further complicate the issue, numerous tags may be within a single dispenser's communication field to provide a situation where multiple dispensers are talking with multiple tags. Although current systems are available for determining the existence and identity of tags, applicants are not aware of any systems providing an economical and effective system and process to associate the proximity of a tag with the various dispensers in close proximity to each other, which may cause multiple tags to be read by multiple dispensers within a narrowly defined time frame.

SUMMARY OF THE INVENTION

The present invention provides a system to store a sequence of data records relating to attributes of interactions between fuel dispensers and tags. The data records may be stored on the tag or at a location remote from the tag, such as a fuel dispenser, central site controller or other network. The data records may contain the identity of the dispenser, tag and an attribute of a received signal, such as frequency band or signal strength, or other attribute indicative of proximity. Every dispenser that attempts to communicate with a tag in question adds its own interaction data to a limited history of a tag's past interactions with the same and other dispensers. When a dispenser or central site control system examines the contents of the interaction histories, the detected presence of other dispensers or the relative strength of the recorded interaction attributes will determine what, if any, action is to be taken by the dispensers or central site control system to communicate with the tag at issue.

Accordingly, one aspect of the present invention provides a remote communication unit arbitration system including a control system that has associated memory and communication electronics operatively associated with the control system. The communication electronics may have a transmitter for transmitting signals to a remote communication unit and a receiver for receiving signals from the remote communication unit. The arbitration system also includes attribute monitoring electronics having an input associated with the control system and an output associated with the communication electronics. The attribute monitoring electronics are adapted to 1) monitor an attribute of a signal received by the communication electronics wherein the attribute is indicative of the relative proximity of the remote communication unit and the dispenser, and 2) provide the control system with a new proximity value indicative of the relative proximity of the remote communication unit and the dispenser. The control system is preferably adapted to compare the new proximity value with a prior proximity value from a prior communication with the remote communication unit and determine a relative proximity of the remote communication unit to the housing with respect to a communicative device associated with the prior communication based on the new and prior proximity values. For simplicity, the remote communication unit is referred to as either a tag or transponder, and the communication electronics are referred to as an interrogator.

The control system may also be adapted to obtain the prior proximity value from a record in an interaction attribute database having a listing of records wherein each record includes 1) a prior proximity value associated with a prior communication with the remote communication unit from a communicative device, and 2) communication indicia of the communicative device. The control system may also be adapted to cause the new proximity value to be added as a record to the interaction attribute database in association with a unique identification indicia representative of a communicative device. The control system may determine the relative proximity of the remote communication unit by determining the proximity value representative of the closest proximity. The interaction attribute database may be located at the remote communication unit wherein the control system is adapted to access the database via radio communications through the communication electronics, but is preferably located at a central control system apart from the dispensers.

The interaction attribute may be derived from a signal strength measurement provided by the interrogator and sent to the control system. In such an embodiment, the interrogator may include signal strength electronics configured to provide the interaction attribute proportional to a strength measurement of a signal received by the communication electronics. The signal strength electronics may include automatic gain control circuitry adapted to amplify the received signal to a nominal signal strength. The gain control circuitry may include an output proportional to the gain necessary to amplify the received signal to the nominal signal strength, wherein the output represents the interaction attribute.

In particular, the gain control circuitry may include a variable gain amplifier having a gain input and a signal wherein the signal input receives the received signal from a remote communication unit. The gain control circuitry also includes a gain control amplifier having an input derived from the normalized signal of the variable gain amplifier's output and an output representing the amount of gain necessary to normalize the received signal. The output also provides feedback to the variable gain amplifier. The output of the gain control amplifier may be fed into an analog-to-digital converter to provide a digital string representing an amount of gain necessary to normalize the received signal. Those skilled in the art will be aware of other common methods of determining signal strength.

Alternatively, the interaction attribute or proximity values may be derived from detecting a number of errors occurring during a communication between the remote communication unit and a communicative device. The control system may be adapted to count the number of errors during the communication to provide an interaction attribute wherein the number of errors occurring during a communication is indicative of a relative proximity. Similarly, the interaction attribute may be derived from detecting a number of attempts at communication without completion between the remote communication unit and a communicative device. In general, the interaction attribute may be virtually any attribute indicative of a relative proximity between the remote communication unit and the fuel dispenser. Furthermore, the interaction attributes may be monitored or checked to determine if other communicative devices have communicated with the remote communication unit, where the remote communication unit has been, its direction of travel and movement, as well as whether or not the remote communication unit is moving.

Yet another aspect of the present invention provides a method of independently arbitrating between remote communication units wherein records are either stored at a central control system or on the remote communication unit. The method typically comprises 1) transmitting a signal to a remote communication unit; 2) receiving an identification indicia from the remote communication unit; 3) determining an interaction attribute indicative of a relative proximity of communication between the remote communication unit and the dispenser based on the received signal; 4) obtaining from the remote communication unit a proximity value associated with a prior communication between the remote communication unit and a communicative device and an identification indicia of the communicative device; and 5) determining a relative proximity of the fuel dispenser with respect to the communicative device based on the interaction attributes associated with the fuel dispenser and the communicative device.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
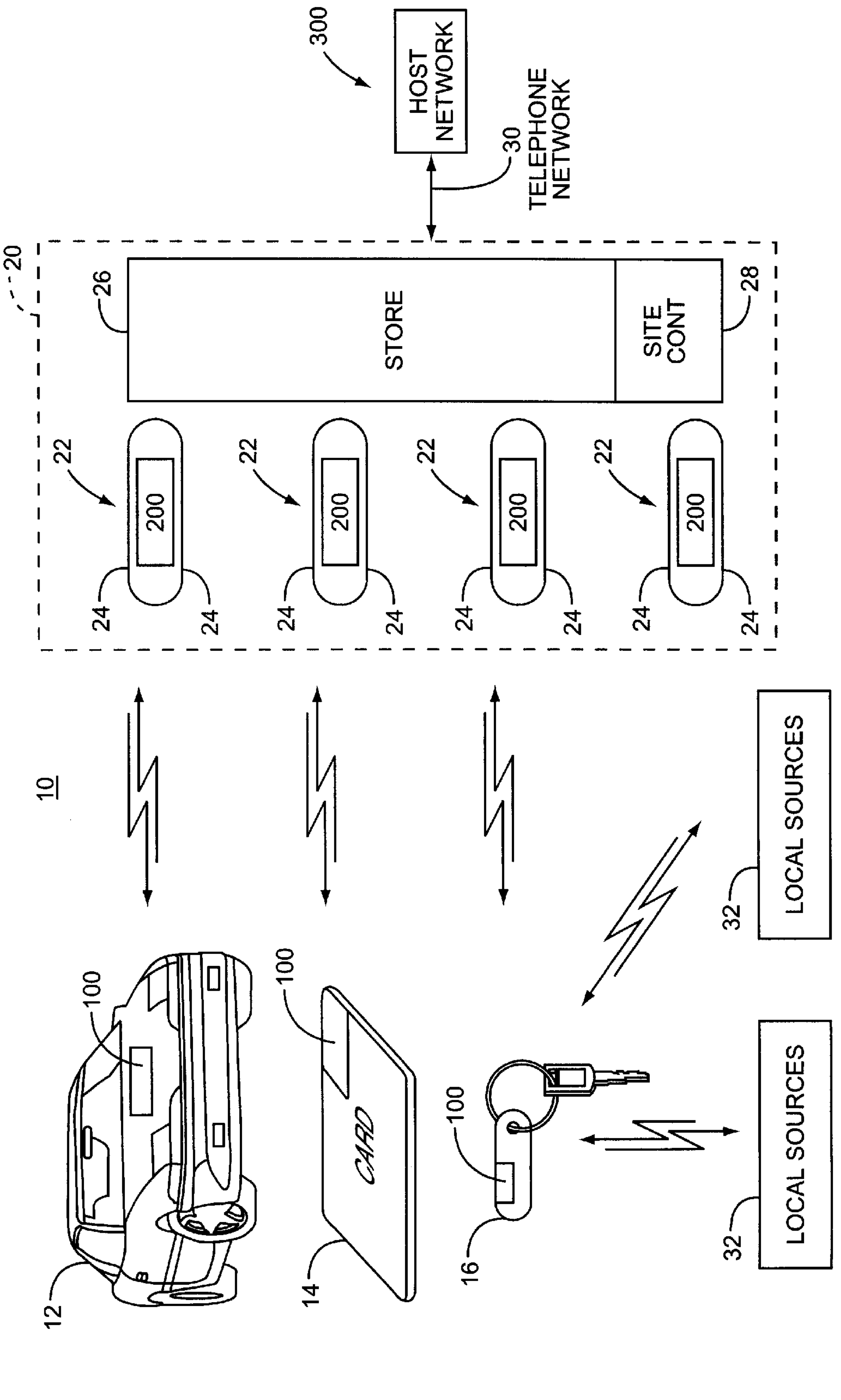
FIG. 1 is a schematic of a service station constructed and implemented according to a preferred embodiment of the present invention including various possible tags interacting with fuel dispensers and a host network through a central control system.

In the following description, like reference characters designate like or corresponding parts throughout the several figures. Referring now to the drawings in general, and FIG.

1 in particular, please understand that the illustrations are for the purpose of describing preferred embodiments of the invention and are not intended to limit the invention thereto. As best seen in FIG. 1, a retail transaction system generally designated 10, is shown constructed according to a preferred embodiment of the present invention. The transaction system 10 typically includes or is associated with three subsystems: a remote communication unit 100 (hereinafter a tag); a fuel dispenser 200 and a host network 300. In general, remote communication units 100 are adapted to communicate with and through the fuel dispenser 200 in order to obtain authorization and communicate information to and from the various subsystems. The tag 100 may also communicate with other local sources 32 directly.

Various means of security are employed depending on the information being communicated and the source and destination of the information. The tag 100, POS device 200 and host network 300 may be adapted to encrypt and decrypt certain communications there-between. For additional detail relating to secure communications, attention is drawn to U.S. application Ser. No. 08/895,417, filed Jul. 16, 1997, entitled Cryptography Security for Remote Dispenser Transactions, in the name of William S. Johnson, Jr.; U.S. application Ser. No. 08/895,282, filed Jul. 16, 1997, entitled Memory and Password Organization for Remote Dispenser Transactions, in the name of William S. Johnson, Jr.; and U.S. application Ser. No. 08/895,225, filed Jul. 16, 1997, entitled Protocol for Remote Dispenser Transactions, in the name of William S. Johnson, Jr. The disclosures of each of these applications are incorporated herein by reference. U.S. application Ser. Nos. 08/649,455 and 08/759,733 and provisional application Ser. No. 60/060,066 disclose further details on similar communications systems and are also incorporated herein by reference.

The tag 100 is preferably integrated into a small carrying medium, such as a module mounted in or on a vehicle 12, a transaction card 14 or a key fob 16. Regardless of the medium carrying the tag 100, the tag is preferably designed to provide remote bi-directional communications with the fuel dispenser 200. Preferably, the fuel dispenser 200 is placed in a fuel dispensing environment 20, and in particular, at each of two fueling positions 24 of the fuel dispenser 22. The dispensers are operatively associated with a central station store 26 by a conventional wire system. The store 26 may house a convenience store as well as one or more restaurants, a car wash or other commercial establishment.

Many fuel dispensing environments 20 provide other goods and services, such as fast food and car washes. Generally the store 26 will include a central site controller 28 to provide central control functions for the entire site including each dispenser 22. Each dispenser, and its respective POS (point-of-sale) electronics, generally communicates either directly, or indirectly with the central site controller 28, which in turn may communicate with the host network 300 via a telephone network 30. The host network 300 generally provides authorizations and other data for the various transactions attempted at each fuel dispenser 200.

In addition to communicating with the fuel dispensers 200, the transponders 100 are also adapted to communicate with various other local sources 32 for various informational and transaction-type functions. These local sources 32 may include any number of goods or service providers, such as local quick-serve restaurants.

Figure 2A:
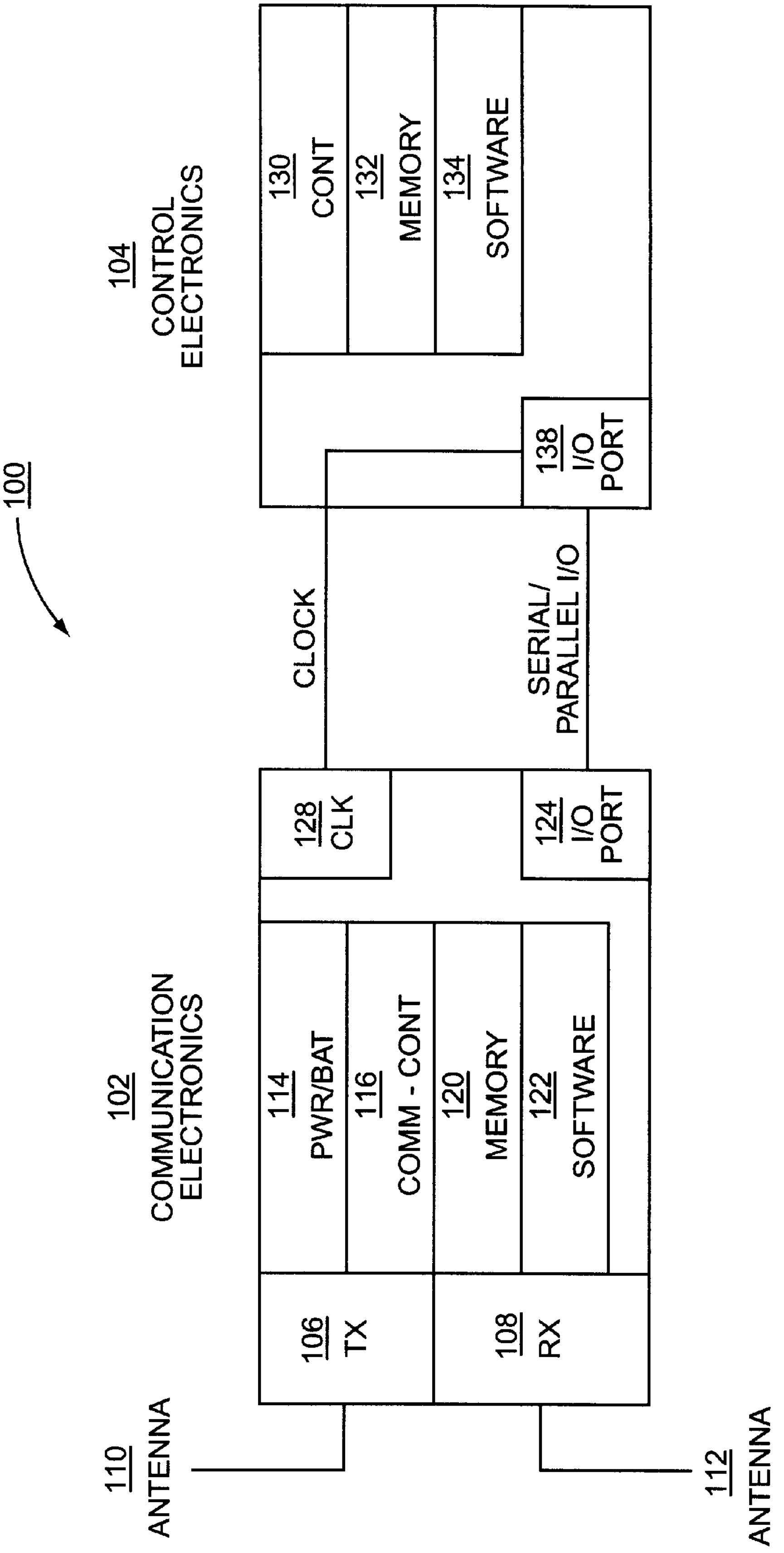
FIG. 2A is a block representation of the tag constructed according to the preferred embodiment.

One embodiment of the tag 100 is shown in FIG. 2A. Communications electronics 102, adapted to provide remote communications with various remote sources, includes a transmitter 106 and receiver 108 having associated antennas 110, 112. The transmitter 106 and receiver 108 operate to transmit data from and receive data into the remote communications unit 100. The communications electronics 102 may also include a battery power supply 114, a communication controller 116 associated with a memory 120 having the software 122 necessary to operate the communications electronics 102 and communicate with the control electronics 104. Serial communications between the communication electronics 102 and the control electronics 104 is provided via the input/output (I/O) ports 124, 138 associated with the respective electronics. The communication electronics 102 provide a clock 128 signal to the I/O port 138 of the control electronics 104. The control electronics 104 may include a controller 130, memory 132 and software 134 to provide remote processing. The memory 120, 132 may include random access memory (RAM), read only memory (ROM), or a combination of both. Notably, the communication controller 116 and the general controller 130 may be integrated into one controller. Similarly the software and memory of the communication and general control modules may be merged. Notably, the communication electronics 104 and communication electronics 102 may be combined, and may also include encryption hardware or software.

Figure 2B:
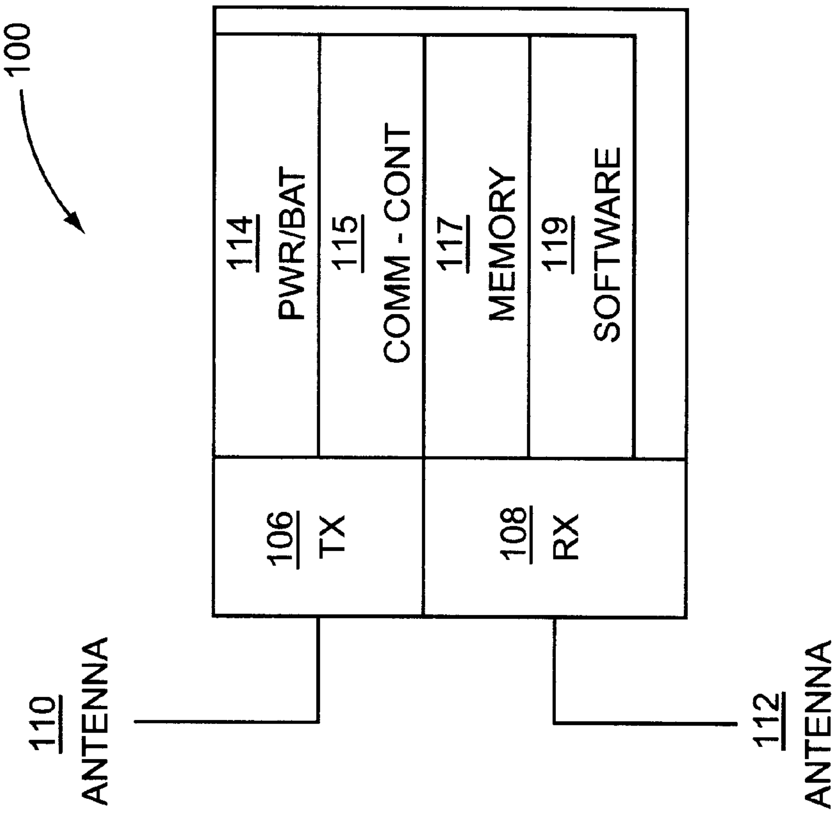
FIG. 2B is a block representation of the tag having integrated electronics constructed according to the preferred embodiment.

As shown in FIG. 2B, the communication and general control electronics, as well as any associated controllers may be integrated into a single controller system and/or integrated circuit. In such cases, a single controller 115 is associated with memory 117 having any software 119 necessary for operation. In such an integrated system, the controller 115 will carryout any control functions.

The communication electronics 102 may be the Micron MicroStamp™ produced by Micron Communications, Inc., 8000 South Federal Way, Boise, Id. 83707-0006. A detailed description of the MicroStamp™ is provided in the data sheets and the MicroStamp Standard Programmers Reference Manual provided by Micron Communications, Inc. These references and the information provided by Micron Communications on their website at HTTP://WWW.MCC.MICRON.COM are incorporated herein by reference. The Micron MicroStamp™ is an integrated system implementing a communications platform referred to as the MicroStamp™ standard on a single CMOS chip. The communications controller 116 preferably provides a spread spectrum processor associated with an eight-bit microcontroller. The memory 120 includes 256 bytes of RAM. The receiver 108 operates in conjunction with the spread spectrum processor and is capable of receiving direct sequence spread spectrum signals having a center frequency of 2.44175 GHz. The transmitter 106 is preferably a differential phase shift key (DPSK) modulated back-scatter transmitter transmitting DPSK modulated back-scatter at 2.44175 GHz with a 596 KHz sub-carrier. Notably, any type of communications scheme is acceptable, and the invention should not be limited to those discussed in the preferred embodiment.

In order to save power and extend battery life, the communication electronics 102 may operate at a low-current sleep mode until an internal programmable timer causes it to wake up. The communication electronics 102 determines whether there is a properly modulated signal present and, if not, immediately returns to the sleep mode. The modulated signal, which the communication electronics 102 monitors once it awakens, is provided by the fuel dispenser 200 or one of the local sources 32. If a properly modulated signal is present, the communication electronics 102 processes the received command and sends an appropriate reply. The communication electronics 102 then returns to the sleep mode. The communications electronics 102 causes the control electronics 104 to awaken as necessary to process data, receive information, or transmit information.

Figure 3:
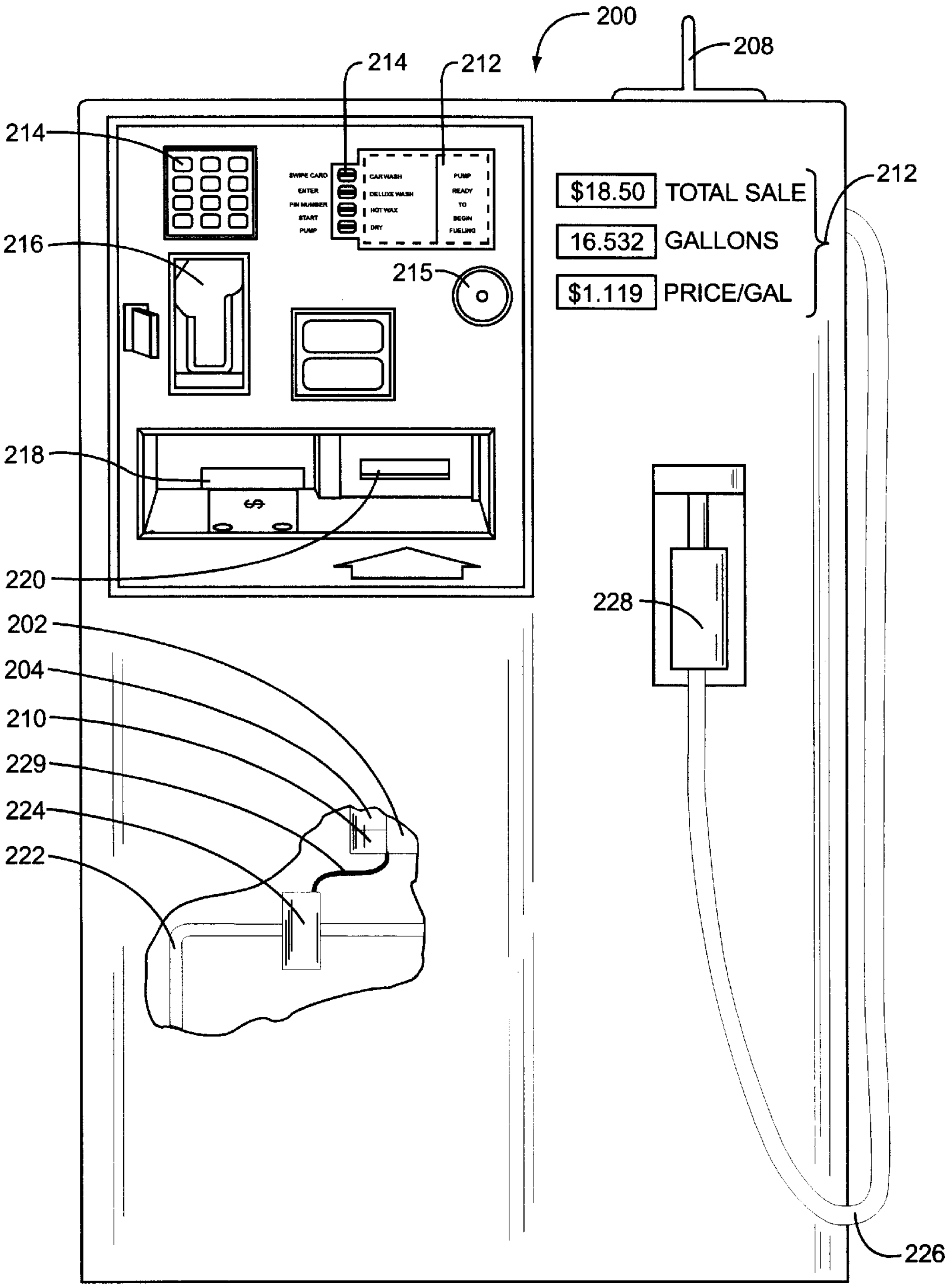
FIG. 3 is a an elevational view of a fuel dispenser constructed according to a preferred embodiment.
Figure 4:
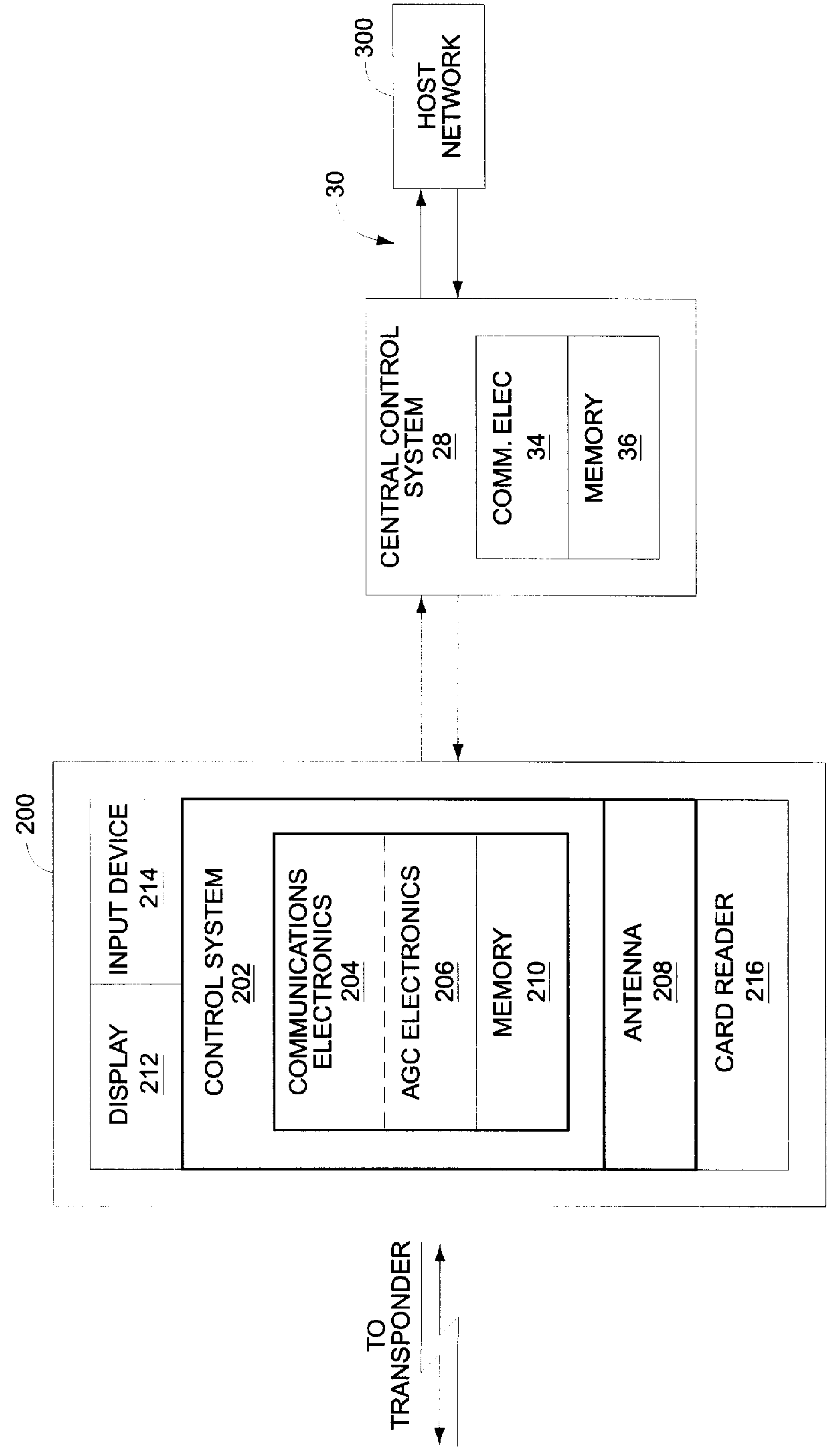
FIG. 4 is a block diagram of a fuel dispenser and central control system constructed according to the preferred embodiment.

As seen in FIGS. 3 and 4, a fuel dispenser 200 will preferably include a control system 202 having communications electronics or interrogator 204 associated with an automatic gain control electronics 206 and one or more antennas 208. The control system 202 will also have sufficient memory 210 for operation. The control system 202 may also be associated with various displays 212 and input devices 214, such as keypads or touch screens. An audio system 215 may also be provided.

The dispenser 200 may also be equipped with a card reader 216, cash acceptor 218 and a receipt printer 220 for memorializing transactions. Each dispenser 200 is typically equipped with a conventional fuel supply line 222, metering device 224, delivery hose 226 and a nozzle 228. The metering device 220 communicates data relating to the volume of fuel dispensed along line 229 to the control system 202. In addition to the hardware described, the dispenser may include a vapor recovery system, flow control valves and related control hardware and electronics.

With reference to FIG. 4, the dispenser 200 is adapted to communicate with a tag (not shown) and the central control system 28, which may also communicate with the host network 300 through a standard telephone interface 30. The central control system 28 may include communications electronics 34 and a memory 36 having the requisite capacity and software necessary to run the control system and facilitate communications to and from the dispenser and host network.

Figure 5:
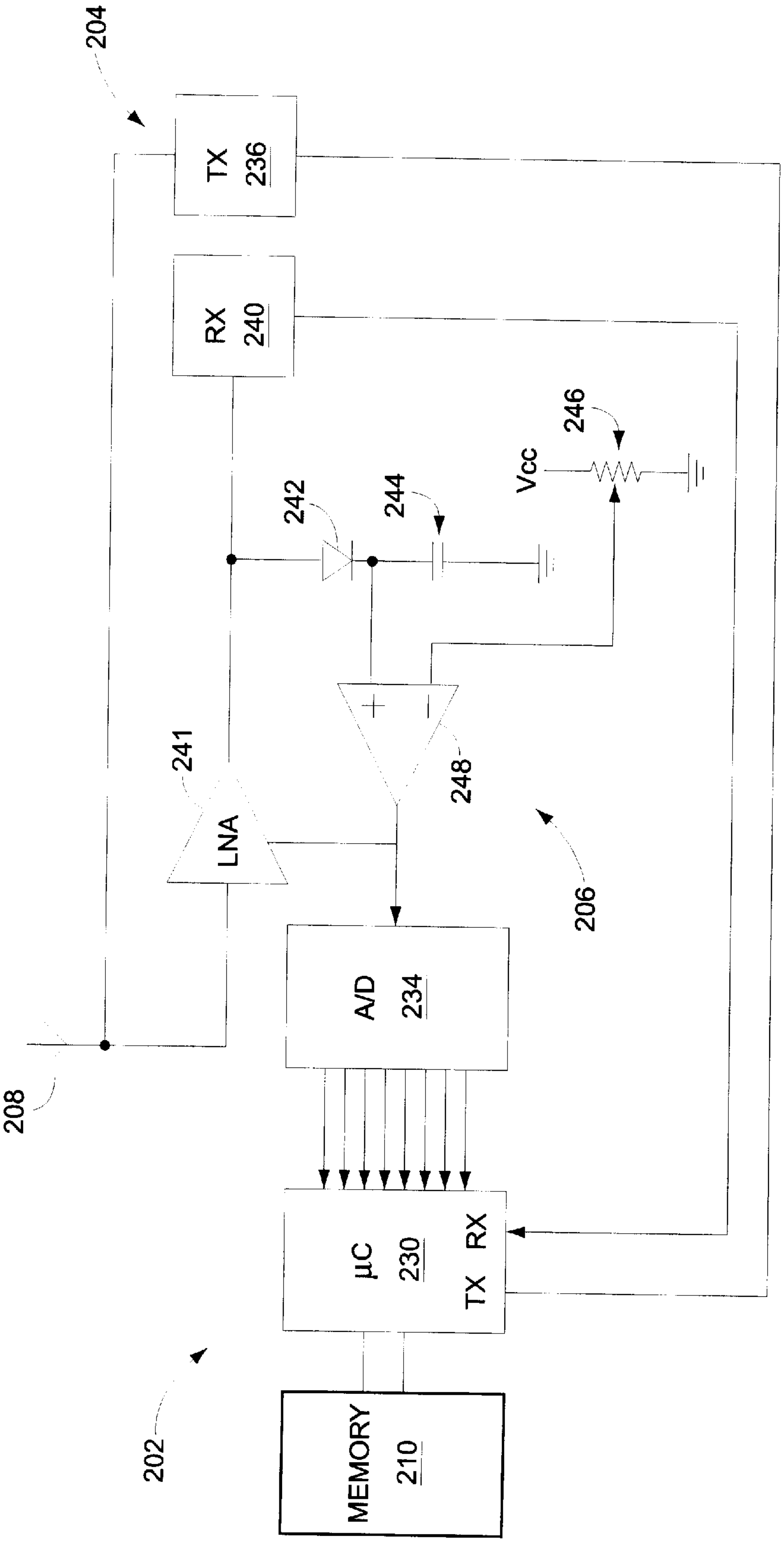
FIG. 5 is an electrical schematic of a fuel dispenser's control system having communication electronics and automatic gain control circuitry designed according to the present invention.

As shown in FIG. 5, the dispenser control system 202 and communications electronics 204 will preferably operate in association with automatic gain control electronics 206. These systems will operate together to amplify a signal received from a tag to a normalized level to ensure proper reception and demodulation at receiver 240, which provides a demodulated output to a microcontroller 230 of the control system 202. The demodulated output represents information transmitted from the transponder to the dispenser. The microcontroller 230 will receive the demodulated information and process the information accordingly.

The signal received at antenna 208 is initially sent to a low-noise amplifier (LNA) 241 having feedback resulting in the normalized output, which is sent to receiver 240. The normalized output is also sent to the feedback circuitry in the automatic gain control electronics 206. These feedback components include a diode 242, capacitor 244, amplifier 248, and a potentiometer 246. The potentiometer 246 is connected between power (vcc) and ground and is used to provide a reference voltage at the inverting input of amplifier 248.

The normalized signal from the low noise amplifier 241 is rectified through the diode 242 and charges capacitor 244 to a DC level indicative of the normalized output level of the low noise amplifier 241. The amplifier 248 provides an output indicative of the voltage differences received at the inverting and non-inverting inputs. This difference is indicative of the difference between the normalized output of the low noise amplifier 220 and the voltage reference set by the potentiometer 246. The output of amplifier 248 is proportional to the difference between the reference and the normalized output of the low noise amplifier 241 and is used to control the gain of the low noise amplifier 241. Thus, amplifier 248 will adjust the gain of the low noise amplifier 241 so that the normalized output of the low noise amplifier 240 results in a DC value at the non-inverting input equal to the reference value appearing at the inverting input of the amplifier 248. The output of the amplifier 248 is also sent to the analog to digital converter 234, which provides a digital string indicative of the amount of gain necessary to bring the signal originally received at antenna 208 up to a normalized level at the output of the low noise amplifier 241 and received by the receiver 240. The microcontroller will receive the digital string and preferably associate the string with a tag identification number (ID) in memory 2 10. Preferably, the signal received at the antenna 208 will include the tag ID.

In other words, when a signal from a tag appears at antenna 208, the communication electronics 204 and automatic gain control electronics 206 operate to normalize the signal for reception at the receiver 240, provide a value indicative of the amount of gain necessary to provide the normalized signal for reception and demodulate information on the received signal for the microcontrol system 202. Preferably, the communication electronics will take the form of an interrogator having the automatic gain control electronics integrated therein. The interrogator will provide an indicator of signal strength as well as the received signal itself to the control system 202.

In operation, tag arbitration may operate according to one of two basic processes. The first process creates a memory stack inside the intrinsic memory of the applicable tag. The tag records the short term history of any attempts by dispensers to access the tag along with attributes that indicate the quality of the interaction. Examples of these attributes include signal strength (i.e., the inverse of the gain signal determined above), number of errors recorded per transmission, and number of attempts at communication without completion. These latter attributes may be determined using hardware, software and techniques apparent to those of ordinary skill in the art. All of these attributes, or similar attributes, would indicate the quality of the interaction between the tag and the dispenser. Since signal strength, error rates and successful connection rates degrade with physical distance from the dispenser's communication electronics, degradation of the attributes is a representative indicator of the physical distance between the dispenser and the tag. For arbitration, the dispensers place their interaction data and attributes into any tag they read and other dispensers do the same, while preserving the data from past interactions. The dispensers retrieve the information stored in the tags. The multiple dispensers review the memory records within the tag and can determine that other dispensers have recently been writing to the tag. Each dispenser independently makes a determination based on the interaction attribute history as to which of the dispensers was closest to the tag and, thus, should be allowed to communicate solely with the tag in question.

The second, and preferred, process provides similar arbitration, with the exception that arbitration data is not stored in the tag, but is stored at the central site control system memory 36 (or perhaps in the dispensers or other associated system). In the latter process, the tag ID is stored in association with the dispenser communicating with the tag and the attribute indicative of proximity. The central control system 28 polls the various dispensers, updates the attribute records, and determines the dispensers closest to the respective tags. In any of the systems, the respective control systems may monitor movement, location and continued presence of any tag with respect to any of the dispensers communicating with the tag.

Figure 7:
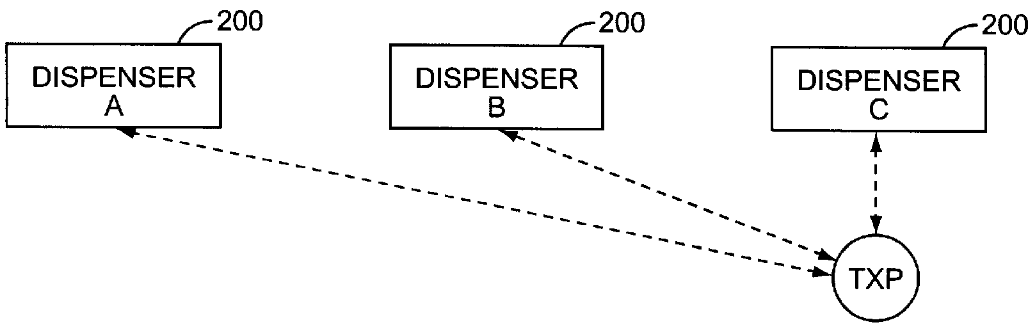
FIG. 7 is a schematic diagram of three fuel dispensers and a tag associated with the arbitration process of FIGS. 6A and 6B.
Figure 8:
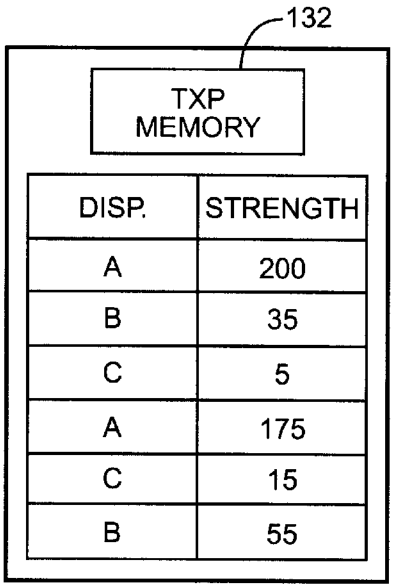
FIG. 8 is a schematic diagram exemplary of a tag memory associated with the process shown in FIGS. 6A and 6B.

Turning now to FIGS. 7 and 8, the process of the first embodiment will be described. In this embodiment, interaction histories between the various dispensers and the given tag are stored in the tag's memory 132. The dispenser communicating with the tag will examine the accumulated data stored on the tag and update the data as necessary for each interaction. As shown in FIG. 7, dispensers A, B and C either are or have recently communicated with the tag shown. The most recently updated history of interactions are shown in FIG. 8, which depicts the tag memory 132 and the history stored therein. The tag memory includes a series of interaction fields linking a dispenser with the relative strength of the communication associated therewith. For example, the tag memory indicates the most recent communication was made with dispenser A and the strength field has a value 200 stored in association with the communication with dispenser A. In this example, the strength field value (i.e., the gain required to normalize the reception) is inversely proportional to the distance between the tag and the dispenser.

In this embodiment, the data string from the automatic gain control electronics 206 will be lower for strong signals because the amount of gain necessary to amplify the signal received at the antenna 208 to a normalized level is low. As can be seen in FIG. 8, the most recent communications with dispensers A, B and C (i.e., the top three records) indicate interaction strength values of 200, 35 and 5, respectively. This means that dispenser C is the closest to the tag, dispenser A is the furthest from the tag, and dispenser B is between A and C. The last three fields indicate communications with dispensers A, C and B, in that order, with resulting strength values of 175, 15 and 55, respectively. The values indicate that during the earlier sequence of communications with the three dispensers, dispenser C remained the closest and dispenser A was the furthest away from the tag. The strength values also indicate the tag was further away from dispenser C and closer to dispensers B and A than at the times of the more recent series of communications. From these values, the control system can determine that the tag is moving left to right, across drawing FIG. 7 (i.e., towards dispenser C from a direction closer to dispenser A).

Figure 6A:
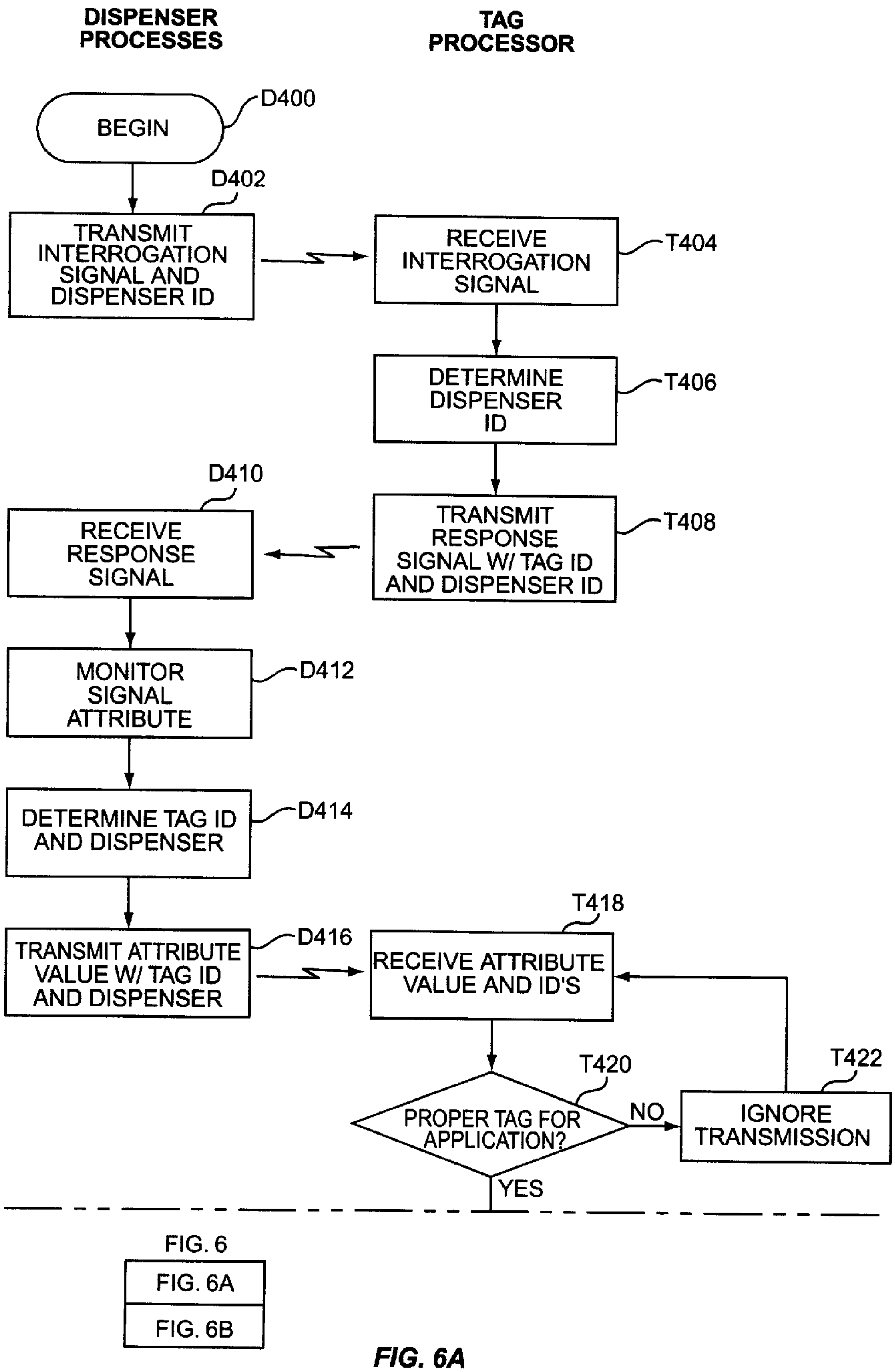
FIGS. 6A and 6B are a flow chart of a first tag arbitration process according to the present invention.
Figure 6B:
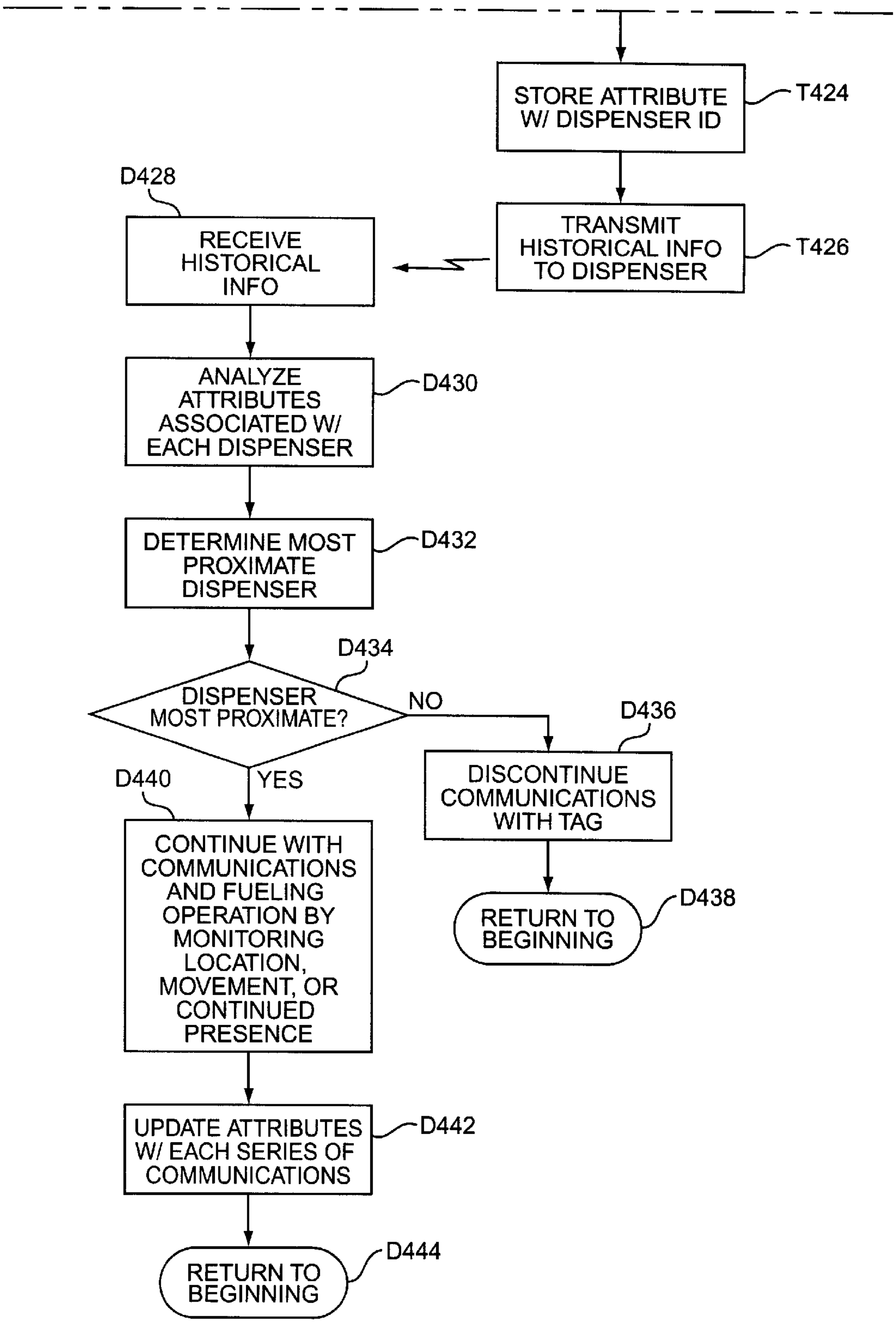

With these concepts in mind, FIGS. 6A and 6B illustrate the flow of the process that begins in block D400. The dispenser transmits an interrogation signal (block D402), which may include a dispenser and/or position identification number, to any of the tags within communication range. A tag receives the interrogation signal (block T404), determines the dispenser ID (block T406) and transmits a response signal including the transponder ID and dispenser ID (block T408). The dispenser receives the response signal (block D410) and monitors an attribute of the signal (block D412) to determine the relative signal strength and/or proximity of the responding tag to the dispenser. Notably, the response signal transmitted from the tag may be received at various dispensers simultaneously and each dispenser will receive the signal, monitor for signal attributes and otherwise function concurrently as discussed herein.

The dispenser may determine the transponder ID and the dispenser ID from the received response signal (block D414) and transmit the attribute values, the associated transponder ID and the dispenser ID (block D416). The various tags in the communication field receive the transmission and determine whether to accept or ignore the transmission based on the transponder ID. In other words, the tags likely receive signals intended for other tags in the communication field. Preferably, the transponder ID of the intended tag or other indicia allow the receiving tag to recognize communications intended for that particular tag and ignore communications directed to another tag. Thus, the receiving tag receives the transmitted attribute values and the transponder and dispenser ID's (block T418) and determines if communications were directed at the particular tag (block T420). If the communications were not meant for the tag, the transmission is ignored (block T422) and the tag waits to receive a communication directed to the tag (block T418).

If the communications are directed to the tag, the tag stores the attribute values in association with the dispenser ID (block T421) and transmits historical information relating to the historical interaction information, including attribute values and associated dispenser ID's (block T426). The dispenser receives the historical information (block D428) and analyzes the attribute values therein associated with each dispenser for the various communication entries (block D430). The dispenser determines the most proximate dispenser based on the current and historical information (block D432). The dispenser next determines if it is the most proximate dispenser to the tag (block D434). If it is not the most proximate dispenser, communications with that particular tag are discontinued (block D436) and the process returns to the beginning (block 438). If the dispenser is the most proximate to the tag, the dispenser continues with communications and possibly the fueling operation (block D440). During this period, the dispenser may continue to monitor communication attributes to derive the tag's location, determine if the tag is moving, and/or check for the continued presence of the tag.

Preferably, the dispenser updates the tags and transmits new attributes with each series of communications to the tag throughout the communication process (block D442) and, at the end of fueling, the process will return to the beginning (block D444). Notably, each dispenser in the fueling environment may be operating in the same manner. That is, various dispensers may be communicating with various tags to independently determine the dispenser closest to the tag, and each tag may communicate with various dispensers in a complementary fashion. Thus, each dispenser independently and concurrently arbitrates among the various tags to select the tag most likely to be associated with a fueling operation.

If a dispenser reads an attribute history and determines its identity as the last recorded contact, the dispenser may simply overwrite the last entry. If the dispenser sees its identity in the record along with the identities of other dispensers that have entered attribute records subsequent to the dispensers last communication, then the currently communicating dispenser may add additional records and preserve all past records, including those of other dispensers. Given that the number of records are of the finite number, it is preferred that new entries will destroy old entries in a first in-first out record structure.

Furthermore, the memory record 132 may be configured so that two or more competing dispensers are allowed to record a number of record attributes into the attribute history. The memory record would recycle and overwrite its oldest entries after a maximum number of entries for a particular dispenser is reached. In this way, a number of entries can be supported from each of the competing dispensers in order for each dispenser to independently calculate any average or normalized results so that a location decision can be made.

In the second and preferred embodiment, the attribute and communication history is not stored in the tag's memory. The historical information is stored in a database apart from the tag and, preferably, at the central site control system 28.

Figure 9A:
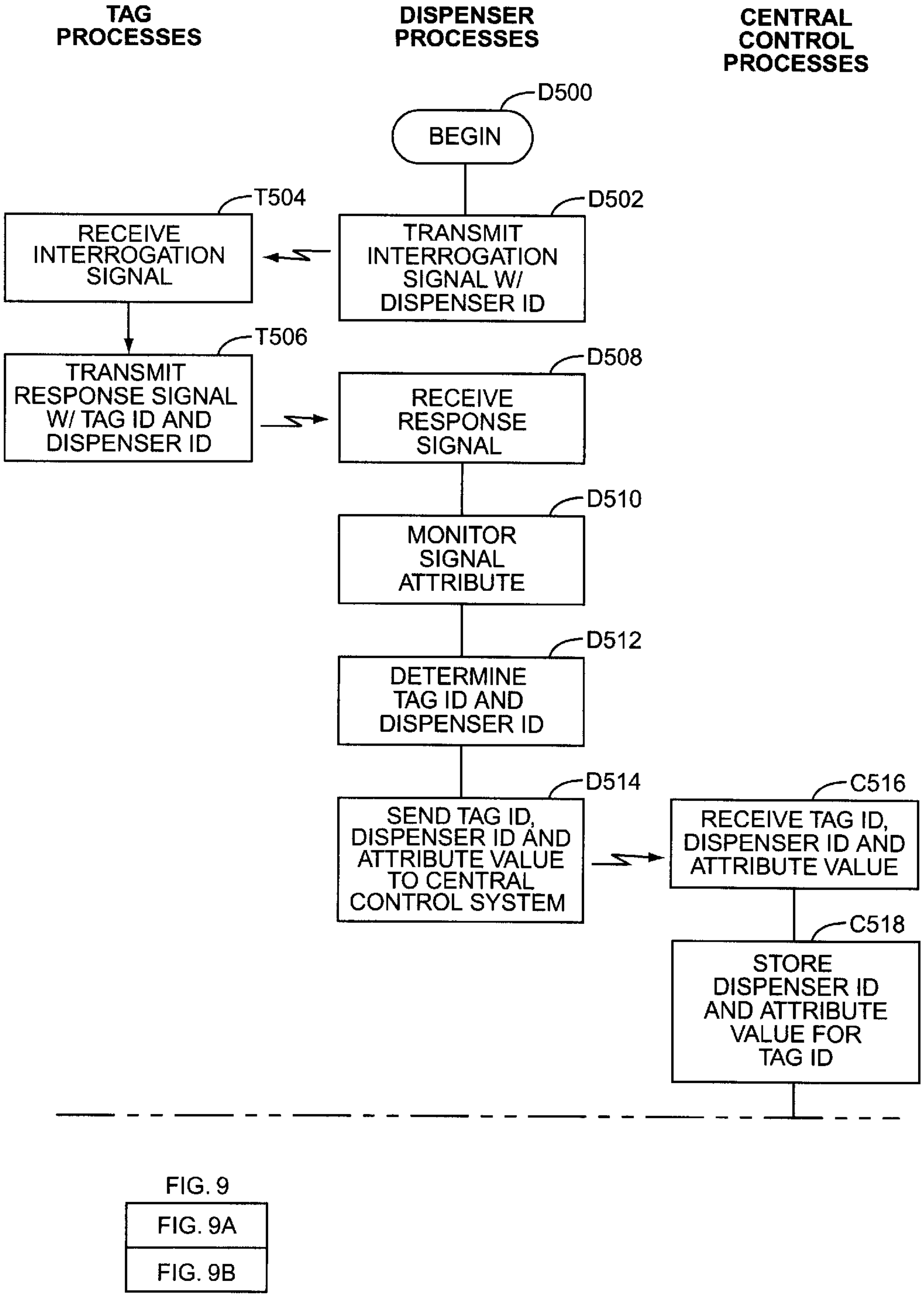
FIGS. 9A and 9B are a flow chart of a second tag arbitration process according to the present invention.
Figure 9B:
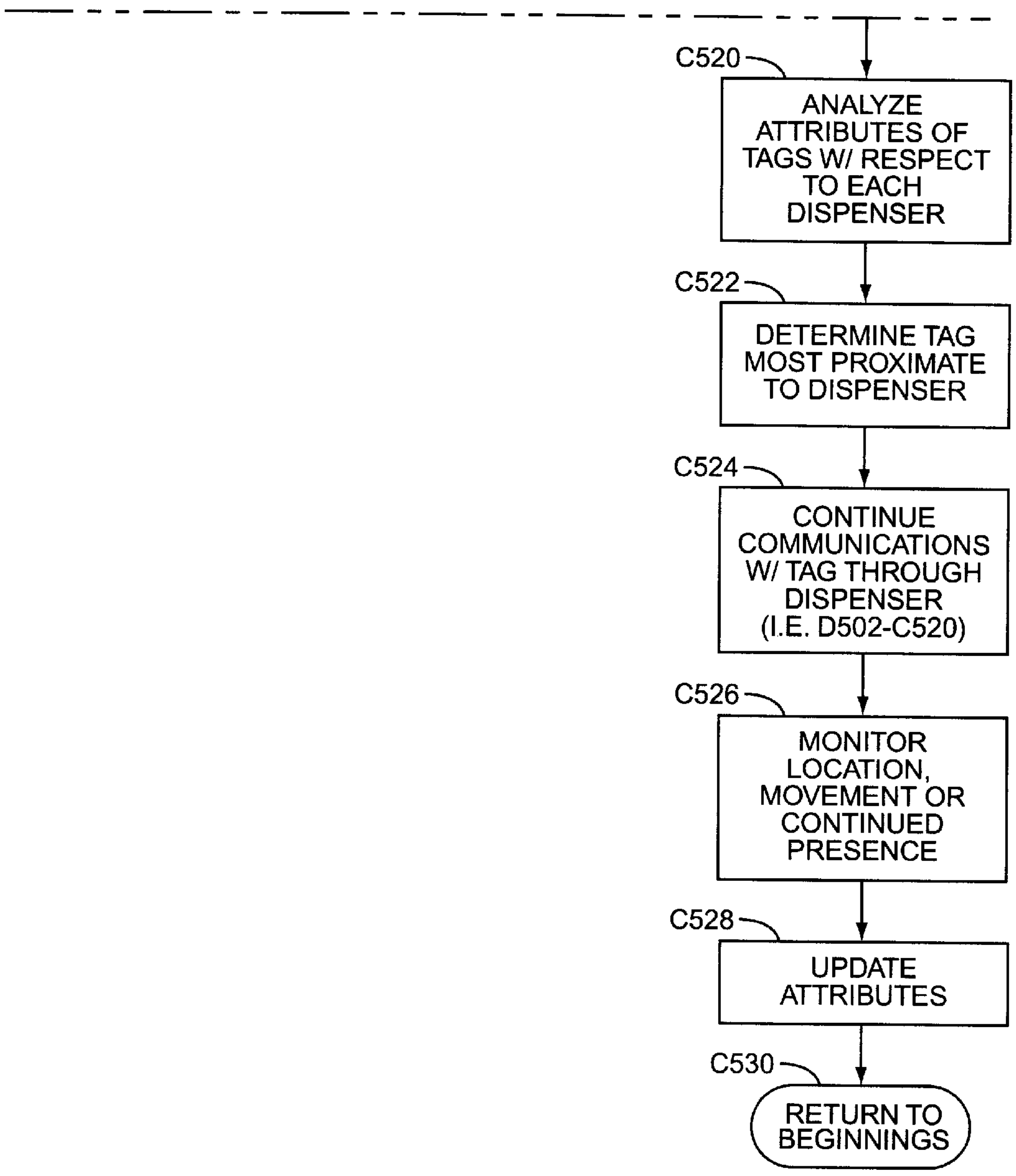
Figures 10, 11:
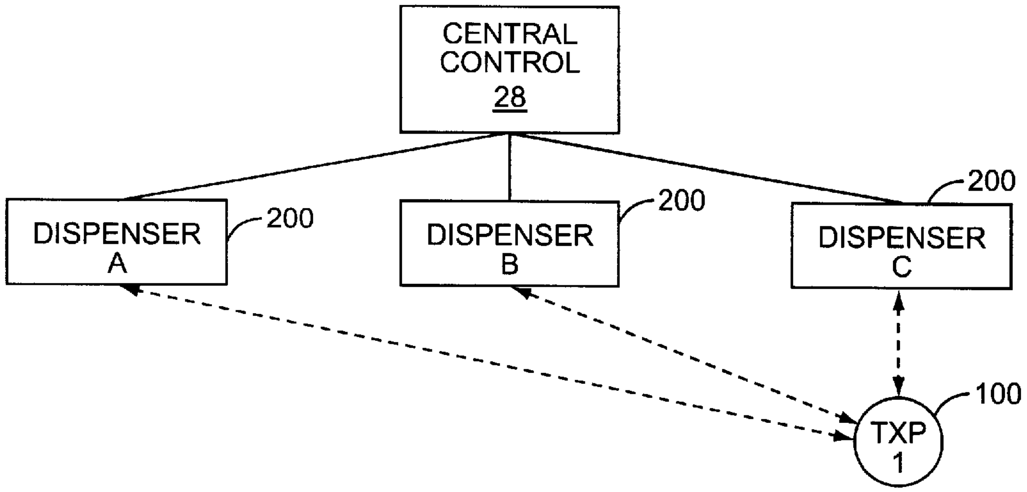
FIG. 10 is a schematic diagram of three fuel dispensers, a transponder and a central control system associated with the arbitration process of FIGS. 6A and 6B.
FIG. 11 is a schematic exemplary of a central control memory associated with the process shown in FIGS. 6A and 6B.

This process is shown in the flow chart of FIGS. 9A and 9B in association with FIGS. 10 and 11, which depict the dispenser and central control system communicating with a transponder (FIG. 10) and the central control system's memory record associated with the transponder ID, communicating dispenser, and corresponding attribute value (FIG. 11). Like the historical record shown in FIG. 8 for the first embodiment, the attribute record shown in FIG. 11 represents historical communication attributes recorded during prior communications. These records are associated with a particular transponder since they are not stored on the transponder. In other words, the historical data is simply stored in a different location than the first embodiment and associated with the transponder to which the communication relates.

In operation, the process begins (block D500) where an interrogation signal is transmitted with a dispenser ID to the various tags in the communication field (block D502). The tag receives the interrogation signal (block T504) and transmits a response with the tag ID and dispenser ID (block T506).

Next, the dispenser receives the response signal having the tag ID and dispenser ID (block D508) and monitors attributes of the received signal (block D510). The dispenser determines the transponder and dispenser ID from the received signal (block D512) and sends these ID's along with the associated attribute values to the central control system (block D514). The central control system receives the transponder ID, dispenser ID and associated attribute value (block C516) and stores this information in the central control system's memory 36 (block C518).

The central control system then analyzes the attribute values of the various transponders with respect to the various dispensers (block C520). The central control system determines the transponder most proximate to the dispenser based on this information (block C522) and operates to have the dispensers communicate with the transponders most proximate thereto in a fashion similar to that shown in blocks C502 through C520 (block C524).

The control system continues to monitor the location of the transponders, the movement of the transponders with respect to the dispensers and/or the presence or absence of the transponders in the various communication fields (block C526). Throughout the communication iterations, the various attribute values and historical records for each of the communications between the dispensers and transponders will be updated (block C528) until the fueling operation is ended, wherein the process will return to the beginning (block C530). As can be appreciated, if during fueling this continued monitoring indicates movement of the vehicle equipped with the tag in question, fueling can be terminated to avoid fuel spillage, and alarms can sound to remind the driver that the nozzle is still in his filler pipe.

Preferably, each dispenser will have communication electronics associated with each fueling position. For example, one interrogator may be controlled in cooperation with antennas for two fueling positions. The interrogator may have automatic gain control electronics 206 and be configured to transmit proximity values and transponder ID's to the central control system 28 for arbitration. The central control system 28 will know from which dispenser and fueling position the information is to be received or each dispenser will transmit the information along with the transponder ID's and proximity values. Arbitrating at the central control system allows overall transponder monitoring throughout the fueling environment. The database kept at the central control system 28 will preferably include transponder ID's associated with fueling positions or interrogator and proximity values received therefrom. The central control system will be able to effect polling at any interrogator at each dispenser by causing the interrogator's transmitter to transmit a polling signal causing the transponders receiving the polling signal to transmit a response signal including the transponder ID. Any of the interrogators receiving the response signal will generate a proximity value, preferably using the automatic gain control electronics. The proximity values and transponder ID's will be sent to the central control system for arbitration to determine the interrogator most proximate to the transponder.

Figure 12A:
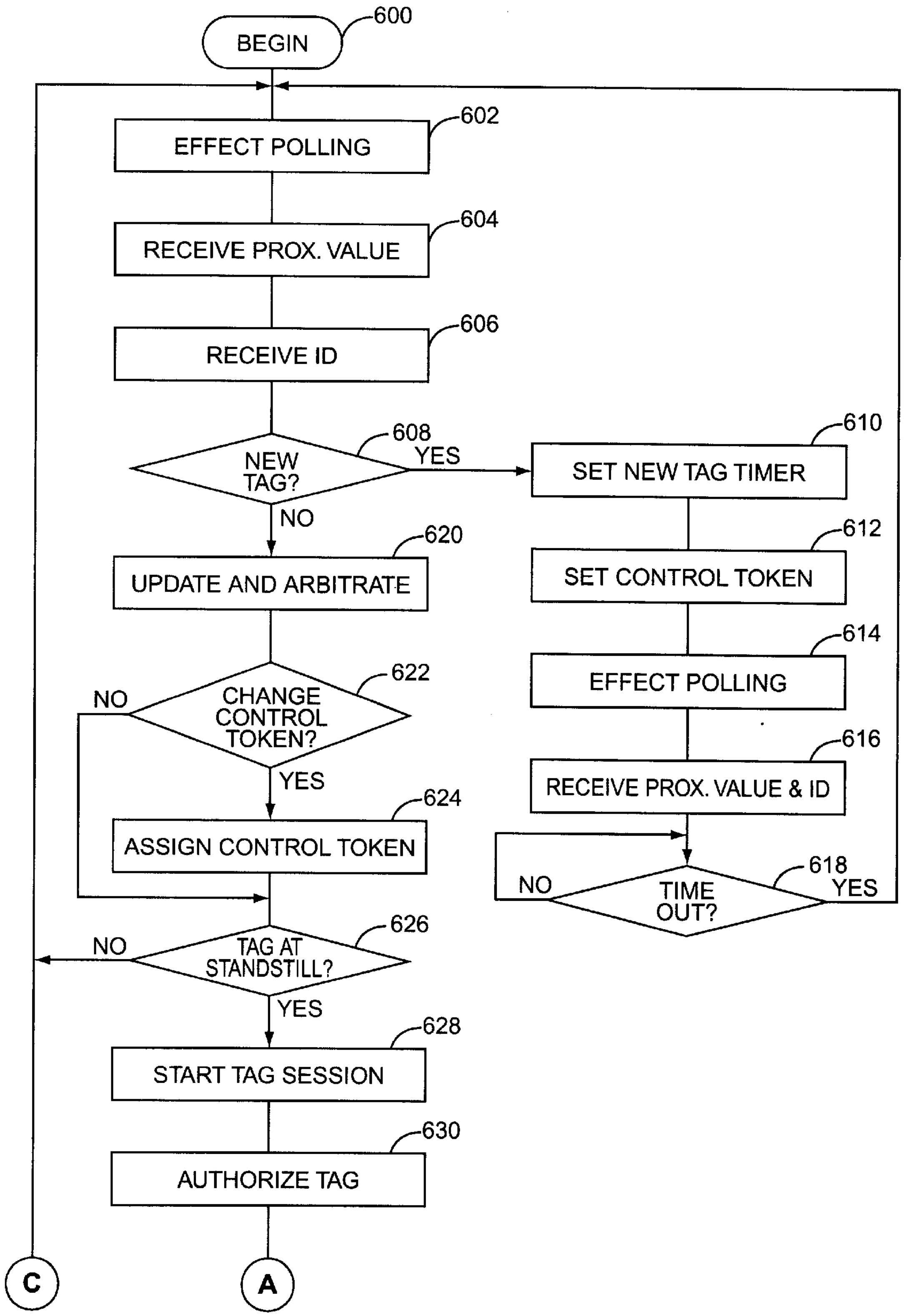
FIGS. 12A through 12C are a flowchart of an arbitration process controlled from a central control system.
Figure 12B:
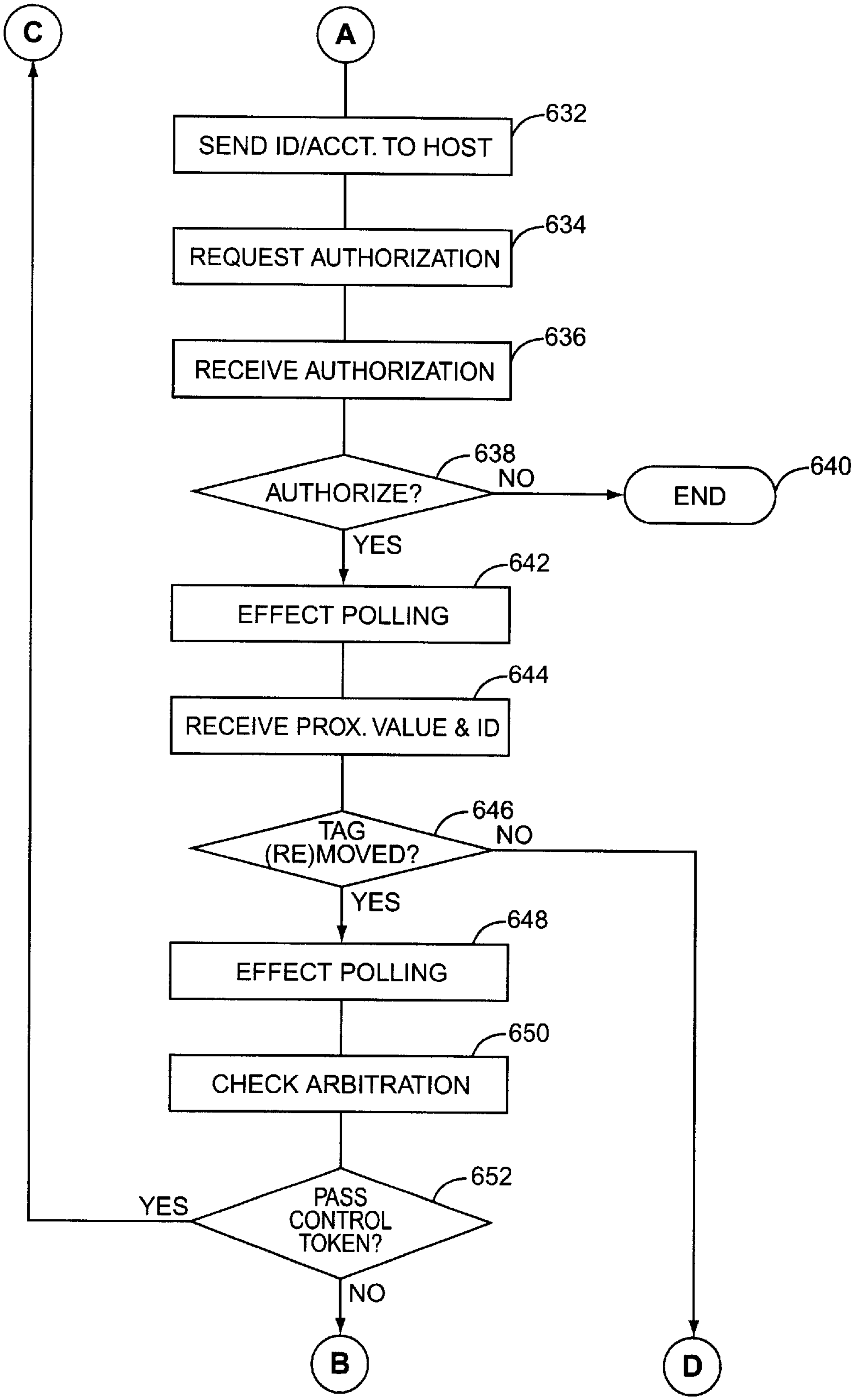
Figure 12C:
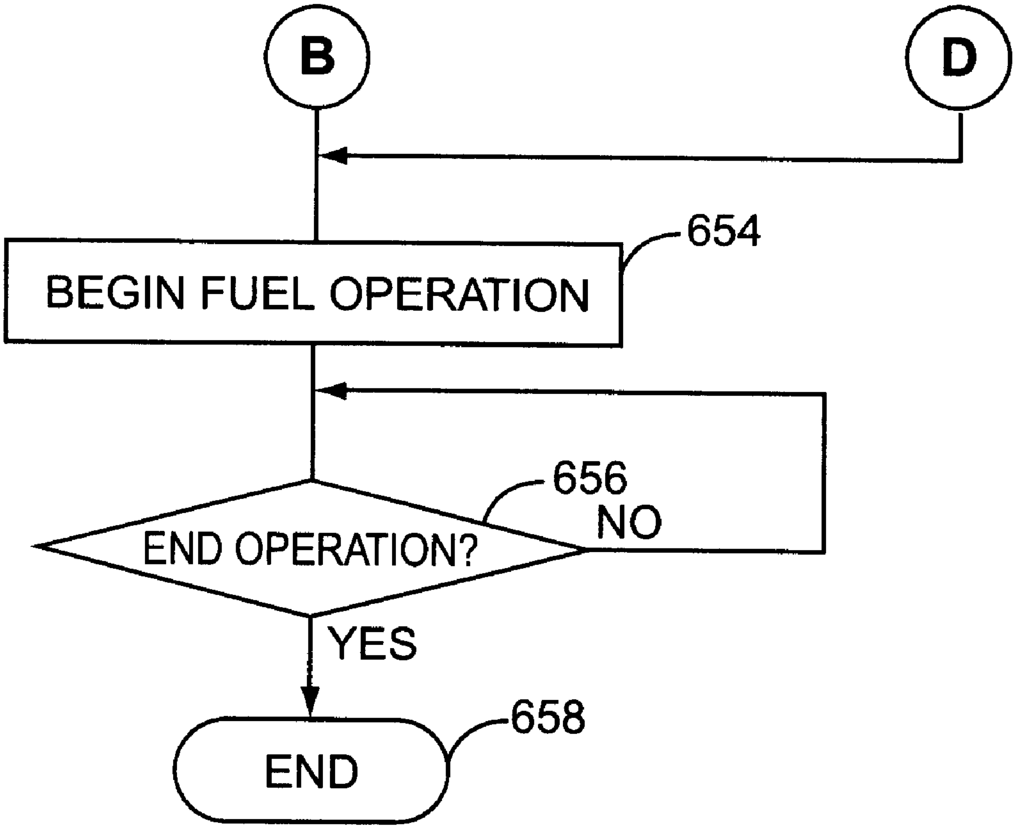

Referring now to FIGS. 12A–12C, a basic overview of the preferred operation of the central control system is shown. The process begins at block 1200 where the central control system effects polling (block 602) of the interrogators throughout the dispenser forecourt. Preferably, the dispenser interrogators are caused to transmit the polling signal independently of other interrogators to reduce the possibility of confusing response signals from the various transponders present in the forecourt. Preferably, each interrogator is sequentially activated to transmit the polling signal and receive response signals. Although each of the interrogators may be activated to transmit polling signals simultaneously, activating individual interrogators or certain groups of interrogators is preferred. Once polling is effected, the control system will receive proximity values (block 604) and transponder ID's (block 606) from the dispensers. The control system will check to see if any new tags responded in the most recent polling (block 608) by comparing the received transponder ID's with the ID's already stored in the database. If a new transponder is present, a timer is set (block 610) and the new transponder is assigned to the first dispenser recognizing its presence. This is referred to as assigning a control token for the transponder to the corresponding dispenser fueling position or interrogator (block 612).

At this point, the control system may effect another polling (block 614), receive proximity values and transponder ID's (block 616), and wait for the timer to time out (block 618). The timer is set for a predetermined time likely to give the new transponder time to settle or stop at a particular fueling position associated with an interrogator. Once the timer times out, the control system effects polling (block 602), receives proximity values (block 604) and associated ID's (block 606), and checks for the presence of any new tags (block 608).

Assuming there are no new tags during this polling, the control system updates the database with the new proximity values for each dispensing position or interrogator and arbitrates tag location (block 620). Arbitration preferably includes a comparison of proximity values for any given transponder associated with any interrogator receiving response signals from that transponder. The control system will determine which interrogator is most proximate to the responding transponders (block 622) and determine if any transponder assignments need to be changed. In other words, the arbitration process determines if the assignment of one transponder to a certain interrogator needs to be changed because that transponder is closer to a different interrogator than it was during a previous polling. If a change is necessary, the control token associated with the transponder will be associated with the interrogator most proximate the transponder during the most recent polling. If a change is necessary, the control system will assign the control token to the interrogator most proximate the transponder (block 624).

If no change is necessary, the control token assignment remains the same for the particular transponder.

The process will next determine if the tag is at a standstill (block 626). This is accomplished by comparing proximity values for a certain transponder at an assigned interrogator over consecutive pollings. If the tag is not at a standstill, the process will again effect polling (block 602) and continue the process as described above.

If the tag is at a standstill, the control system will start a tag session (block 628) and begin to authorize the tag (block 630). During authorization, the control system will send the transponder ID along with any available account information to the host (block 632). The control system will request authorization (block 634) and receive an answer accepting or declining authorization for the given transponder (block 636). If authorization is declined (block 638), the process ends for that particular transponder (block 640). If the transponder is authorized, the control system will preferably effect polling (block 642) and receive proximity values and transponder ID's from the various interrogators. Polling after a transponder is authorized is preferred because during the authorization process the transponder may have moved or communications may have been lost between the associated interrogator and the transponder. Thus, after receiving the additional polling after authorization, the control system will determine if the transponder has been moved or removed (block 646). If the transponder is moved, the control system will effect additional polling (block 648) and check earlier arbitration results to see if the tag has moved or if communications have been reestablished. Next, the control system will determine whether to pass control of the transponder or token to another interrogator (block 652). If communications are reestablished and it is determined that the transponder has not moved from earlier pollings, the control system initiates the start of a fueling operation (block 654) and continues with the operation until fuel has ended (block 656) wherein the process ends (block 658). If communications are not reestablished or it is determined that the transponder has moved during the authorization process, the central control system will revert back to block 602 to effect polling and rearbitrate to determine to which interrogator the transponder is most proximate and if the transponder needs to be reassigned to new interrogator or fueling position.

Determining whether to keep historical data in the tags or at the central control system will depend upon the requirements of the application. Keeping the information in the respective tags allows each dispenser to independently arbitrate which tag is most proximate. These decisions are going on in parallel and do not require communications between the dispensers to facilitate the arbitration. Since each dispenser is provided with identical historical data and operates on that data with identical decision processes, each dispenser will arrive at the same decision. However, certain applications may find benefit in allowing communications between the dispensers through the central control system. The first embodiment allows communications to occur between the dispenser and tag at a much higher rate, because communications are not required between the dispenser and central control system for arbitration. The second embodiment may reduce communication rates, but will provide more centralized control and location monitoring throughout the fueling environment.

Various other modifications and improvements will occur to those skilled in the art upon reading the foregoing description. As noted, it is preferable to use one interrogator in cooperation with communication electronics and/or antennas configured to cover both dispenser positions. Alternatively, each side may have dedicated communication electronics and/or interrogators. In either situation, arbitration will typically determine not only the dispenser, but also the position a transponder is most proximate. It should be understood that all such modifications and improvements have been omitted for the sake of conciseness and readability but are properly within the scope of the following claims.

What is claimed is:

1. A transponder arbitration system for a dispensing environment comprising:

a. communication electronics associated with respective, opposing sides of a plurality of fuel dispensers, the communication electronics adapted to:

i. transmit a polling signal causing transponders receiving the polling signal to transmit a response signal including transponder identifying indicia;

ii. receive response signals from responding transponders; and iii. generate a proximity value based on a characteristic of a received response signal wherein a single response signal from one transponder may be received at one or more communication electronics, which will generate a proximity value at one or more of said communication electronics receiving the response signal; and b. a control system communicatively associated with each of said communication electronics and adapted to compare the proximity values associated with a certain transponder for a given response signal to determine which dispenser side is most proximate to the certain transponder.

2. The transponder arbitration system of claim 1 wherein said control system is further adapted to associate the certain transponder with said communication electronics most proximate the certain transponder and compare subsequent proximity values, generated at one or more of said interrogators and associated with the certain transponder, for a given subsequent response signal transmitted from the certain transponder to determine which dispenser side is most proximate to the certain transponder and associate the certain transponder with one of said communication electronics most proximate the certain transponder.

3. The transponder arbitration system of claim 1 wherein said control system is adapted to effect polling of the transponders by causing said communication electronics to transmit the polling signals.

4. The transponder arbitration system of claim 2 wherein said control system is adapted to effect polling of the transponders by causing said communication electronics to transmit the polling signals and provide a predetermined delay between one polling resulting in said response signal and a subsequent polling resulting in said subsequent polling.

5. The transponder arbitration system of claim 1 wherein said control system is further adapted to determine if the proximity values associated with said communication electronics most proximate to the certain transponder are sufficient to indicate the certain transponder is close enough to said dispenser side to initiate a transaction.

6. The transponder arbitration system of claim 1 wherein said control system is further adapted to monitor subsequent proximity values for the certain transponder associated with said communication electronics most proximate to the certain transponder to determine if the certain transponder is substantially stationary to initiate a transaction.

7. The transponder arbitration system of claim 1 wherein said control system is positioned apart from said fuel dispensers and electrically coupled to said fuel dispensers to effect centralized control of said dispensers.

8. A transponder arbitration system for a dispensing environment comprising:

a. communication electronics associated with respective, opposing sides of a plurality of fuel dispensers, the communication electronics adapted to:

i. transmit a polling signal causing transponders receiving the polling signal to transmit a response signal including transponder identifying indicia;

ii. receive response signals from responding transponders; and iii. generate a proximity value based on a characteristic of a received response signal wherein a single response signal from one transponder may be received at one or more communication electronics, which may generate unique proximity values at one or more of said communication electronics receiving the response signal; and b. a control system communicatively associated with certain communication electronics to effect polling of the transponders by transmitting the polling signals and receiving transponder identification indicia and proximity values; and c. a database maintained by said control system and configured to store proximity values associated with corresponding transponder identifying indicia and corresponding said interrogator generating the proximity values based on the response signal; and d. said control system adapted to compare the proximity values associated with a certain transponder for a given response signal to determine which dispenser side is most proximate to the certain transponder.

9. The arbitration system of claim 8 wherein said control system is further adapted to:

a. effect a first polling of the transponders;

b. receive proximity values and associated identification indicia for responding transponders from said communication electronics receiving a response signal;

c. store the proximity values in said database; and d. assign the certain transponder to said dispenser side most proximate to the certain transponder.

10. The arbitration system of claim 9 wherein said control system is further adapted to:

a. effect a second polling of the transponders;

b. receive proximity values and associated identification indicia for responding transponders from said communication electronics receiving a response signal for the second polling;

c. store the proximity values in said database;

d. compare the proximity values associated with a certain transponder for the second polling to determine which said dispenser side is most proximate to the certain transponder; and e. maintain assignment of the certain transponder to said dispenser side most proximate to the certain transponder if the certain transponder is determined to be most proximate to the currently assigned dispenser side, or reassign the certain transponder to another said dispenser side determined to be most proximate to the certain transponder.

11. The arbitration system of claim 10 wherein said control system is further adapted to delay a determined period of time between the first and second polling.

12. The arbitration system of claim 8 wherein said control system is further adapted to:

a. effect a first polling of the transponders;

b. receive proximity values and associated identification indicia for responding transponders from said communication electronics receiving a response signal;

c. store the proximity values in said database;

d. compare the proximity values associated with a certain transponder for the first polling to determine which said dispenser side is most proximate to the certain transponder;

e. delay a determined period of time;

f. effect a second polling of the transponders;

g. receive proximity values and associated identification indicia for responding transponders from said communication electronics receiving a response signal for the second polling;

h. store the proximity values in said database; and i. compare the proximity values associated with a certain transponder for the second polling to determine which said dispenser side is most proximate to the certain transponder.

13. The arbitration system of claim 8 wherein said control system is configured to:

a. periodically effect polling of the transponders;

b. receive proximity values and associated identification indicia for responding transponders from said communication electronics receiving a response signal for each polling;

c. store the proximity values for each polling in said database;

d. compare the proximity values, associated with a certain transponder for certain dispenser sides, for each polling to determine which said dispenser side is most proximate to the certain transponder at each polling; and e. compare proximity values, associated with a certain transponder, from communication electronics most proximate to the certain transponder to determine if said proximity values from consecutive polling are substantially unchanged, and if substantially unchanged, initialize a transaction for said dispenser side most proximate to the certain transponder.

14. The arbitration system of claim 8 wherein said control system is further adapted to initiate authorization from a remote authorization authority once said transponder proximity is substantially unchanged.

15. The arbitration system of claim 8 wherein said control system is configured to:

a. assign a certain transponder to a dispenser side most proximate to the certain transponder.

b. periodically effect polling of the transponders;

c. receive proximity values and associated identification indicia for responding transponders;

d. store the proximity values for each polling in said database;

e. compare the proximity values, associated with the certain transponder, from different said communication electronics for each polling to determine which said dispenser side is most proximate to the certain transponder at each polling;

f. reassign the certain transponder to said interrogator most proximate the certain transponder if a subsequent polling results in the certain transponder being more proximate to a dispenser side at which the certain transponder is not assigned; and g. compare proximity values, associated with a certain transponder, from said dispenser side most proximate to the certain transponder to determine if said proximity values from consecutive polling are substantially unchanged, and if substantially unchanged, initialize a transaction for said dispenser side associated with said dispenser side most proximate to the certain transponder.

16. The arbitration system of claim 8 wherein said control system is configured to:

a. effect a first polling of the transponders;

b. receive identification indicia for responding transponders from communication electronics receiving a response signal for each polling;

c. store the proximity values for each polling in said database;

d. effect a second polling of the transponders; and e. compare the identification indicia received from the first polling and second polling to determine if a new transponder is present.

17. The arbitration system of claim 16 wherein said control system is configured to:

a. start a timer adapted to run a predetermined period of time when a new transponder is determined to be present;

b. effect a subsequent polling after the predetermined period of time;

c. receive proximity values and associated identification indicia for responding transponders from communication electronics receiving a response signal for each polling;

d. store the proximity values for the subsequent polling in said database; and e. compare the proximity values, associated with the new transponder, from different dispenser sides for the subsequent polling to determine which dispenser side is most proximate to the new transponder.

18. The arbitration system of claim 16 wherein said control system is further configured to:

a. effect another polling; and b. compare proximity values, associated with the new transponder, from said dispenser side most proximate to the new transponder to determine if said proximity values from consecutive pollings are substantially unchanged and, if substantially unchanged, initialize a transaction for said dispenser side most proximate to the new transponder.

19. The arbitration system of claim 8 wherein said control system is configured to:

a. periodically effect polling of the transponders;

b. receive proximity values and associated identification indicia for responding transponders from communication electronics receiving a response signal for each polling;

c. store the proximity values for each polling in said database;

d. compare the identification indicia received from a previous polling with a current polling to determine if a new transponder is present;

e. start a timer adapted to run a predetermined period of time when a new transponder is determined to be present;

f. effect a subsequent polling after the predetermined period of time; and g. compare the proximity values, associated with a certain transponder, from different communication electronics for each polling to determine which dispenser side is most proximate to the certain transponder at each polling.

20. The arbitration system of claim 19 wherein said control system compares proximity values, associated with a certain transponder, from communication electronics most proximate to the certain transponder to determine if said proximity values from consecutive polling are substantially unchanged and, if substantially unchanged, to initialize a transaction for said dispenser side associated with the dispenser side most proximate to the certain transponder.

21. The transponder arbitration system of claim 8 wherein said communication electronics are placed in fuel dispensers on a forecourt and said control system is located apart from said dispensers to provide centralized control.

22. The arbitration system of claim 21 wherein each said dispenser includes communication electronics having one interrogator with a plurality of antennas, at least one said antenna being associated with fueling positions on opposite sides of said dispenser.

23. The arbitration system of claim 8 wherein said proximity values are proportional to signal strength.

24. The arbitration system of claim 8 wherein the proximity value is derived from a signal strength measurement made by said communication electronics, said communication electronics including signal strength electronics configured to provide the proximity value to a strength measurement of a signal received by said communication electronics.

25. The arbitration system of claim 24 wherein said signal strength electronics include automatic gain control circuitry adapted to amplify received signals to a nominal signal strength, said gain control circuitry having an output, proportional to the gain necessary to amplify the received signals to a nominal signal strength, representing the proximity values.

26. The arbitration system of claim 25 wherein said gain control circuitry comprises:

a. a variable gain amplifier having a gain input and a signal, said signal input receiving the received signals from the communication electronics; and b. a gain control amplifier having:

i. an input derived the normalized signal of the variable gain amplifier's output; and ii. an output representing the amount of gain necessary to normalize the received signal and coupled to said gain input of said variable gain amplifier to provide feedback.

27. The arbitration system of claim 26 wherein said output of said gain control amplifier is coupled to an input of an analog-to-digital converter to provide a digital string representing the amount of gain necessary to normalize the received signals, said digital string corresponding to a proximity value.

28. The arbitration system of claim 8 wherein said control system effects polling by causing said communication electronics to transmit a polling signal at one dispenser side at a time.

29. A transponder arbitration method for a dispensing environment comprising:

a. providing communication electronics associated with respective, opposing sides of a plurality of fuel dispensers, and a control system with an associated database maintained by the control system and configured to store proximity values associated with corresponding transponder identifying indicia;

b. generating the proximity values at said communication electronics based on a response signal received from transponders polled by the interrogators; and c. comparing the proximity values associated with a certain transponder for a given response signal to determine which dispenser side is most proximate to the certain transponder.

30. The arbitration method of claim 29 further comprising:

a. effecting a first polling of the transponders;

b. receiving proximity values and associated identification indicia for responding transponders from communication electronics receiving a response signal;

c. storing the proximity values in the database; and d. assigning the certain transponder to the dispenser side most proximate to the certain transponder.

31. The arbitration method of claim 30 further comprising:

a. effecting a second polling of the transponders;

b. receiving proximity values and associated identification indicia for the responding transponders from communication electronics receiving a response signal for the second polling;

c. storing the proximity values in the database;

d. comparing the proximity values associated with a certain transponder for the second polling to determine the dispenser side most proximate to the certain transponder; and e. maintaining assignment of the certain transponder to the dispenser side most proximate to the certain transponder if the certain transponder is determined to be most proximate to the currently assigned dispenser side, or reassign the certain transponder to another dispenser side determined to be most proximate to the certain transponder.

32. The arbitration method of claim 29 further comprising:

a. effecting a first polling of the transponders;

b. receiving proximity values and associated identification indicia for responding transponders from communication electronics receiving a response signal;

c. storing the proximity values in the database;

d. comparing the proximity values associated with a certain transponder for the first polling to determine which dispenser side is most proximate to the certain transponder;

e. delaying a determined period of time;

f. effecting a second polling of the transponders;

g. receiving proximity values and associated identification indicia for responding transponders from communication electronics receiving a response signal for the second polling;

h. storing the proximity values in the database; and i. comparing the proximity values associated with a certain transponder for the second polling to determine which dispenser side is most proximate to the certain transponder.

33. The arbitration method of claim 29 further comprising:

a. periodically effecting polling of the transponders;

b. receiving proximity values and associated identification indicia for responding transponders from communication electronics receiving a response signal for each polling;

c. storing the proximity values for each polling in the database;

d. comparing the proximity values, associated with a certain transponder, and dispenser side for each polling to determine which dispenser side is most proximate to the certain transponder at each polling; and e. comparing proximity values, associated with a certain transponder, from the dispenser side most proximate to the certain transponder to determine if the proximity values from consecutive pollings are substantially unchanged, and if substantially unchanged, to initialize a transaction for the dispenser side most proximate to the certain transponder.

34. A transponder arbitration system for a dispensing environment comprising:

a. a plurality of interrogators associated with a plurality of fuel dispensers, each interrogator including:

i. a transmitter to transmit a polling signal causing transponders receiving the polling signal to transmit a response signal including transponder identifying indicia;

ii. a receiver to receive response signals from responding tags; and iii. means for generating a proximity value for each responding transponder based on a characteristic of each corresponding response signal; and b. a control system communicatively associated with each interrogator and adapted to:

i. effect polling by causing said interrogators to transmit polling signals, ii. compare the proximity values associated with the transponders based on response signals received by said interrogators, and iii. determine a transponder most proximate to a certain said interrogator, and thus a dispenser.

35. The arbitration system of claim 34 wherein said control system is associated with a memory and is further adapted to:

a. effect polling at said interrogators;

b. store proximity values from each interrogator for a given transponder;

c. periodically compare the proximity values associated with the transponders based on the response signals received by each said interrogator; and d. determine when a certain tag most proximate to a certain interrogator stops moving by comparing proximity values for a certain tag received during different polls wherein when the proximity values from said certain interrogator by the different polls are substantially the same, the control system determines the transponder has stopped moving.

36. A transponder arbitration system for a dispensing environment comprising:

a. a plurality of interrogators associated with a plurality of fuel dispensers, each interrogator including:

i. a transmitter to transmit a polling signal causing transponders receiving the polling signal to transmit a response signal including transponder identifying indicia;

ii. a receiver to receive response signals from responding tags; and iii. means for generating a proximity value for each responding transponder based on a characteristic of each corresponding response signal; and b. a control system communicatively associated with each interrogator and adapted to compare the proximity values for one transponder based on a response signal received by said two interrogators to determine the interrogator most proximate to the transponder.

37. A transponder arbitration system for a dispensing environment comprising:

a. one interrogator having at least one antenna at each of two opposing sides of a fuel dispenser, each interrogator including:

i. a transmitter to transmit a polling signal causing transponders receiving the polling signal to transmit a response signal including transponder identifying indicia;

ii. a receiver to receive response signals from responding tags; and iii. means for generating a proximity value for each responding transponder based on a characteristic of each corresponding response signal; and b. a control system communicatively associated with said interrogator and adapted to compare the proximity values of plural ones of the transponders based on response signals received by said interrogator to determine the transponders most proximate to said antennas, and thus dispenser fueling positions.

* * * * *